United States Patent
Moon et al.

(10) Patent No.: US 11,243,566 B2
(45) Date of Patent: Feb. 8, 2022

(54) FOLDABLE ELECTRONIC DEVICE HAVING DUSTPROOF STRUCTURE

(71) Applicant: SAMSUNG ELECTRONICS CO., LTD., Suwon-si (KR)

(72) Inventors: Heecheul Moon, Suwon-si (KR); Kwonho Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/072,772

(22) Filed: Oct. 16, 2020

(65) Prior Publication Data
US 2021/0116963 A1 Apr. 22, 2021

(30) Foreign Application Priority Data
Oct. 18, 2019 (KR) .................. 10-2019-0130254

(51) Int. Cl.
*G06F 1/16* (2006.01)
(52) U.S. Cl.
CPC .......... *G06F 1/1616* (2013.01); *G06F 1/1635* (2013.01); *G06F 1/1681* (2013.01)
(58) Field of Classification Search
CPC .... G06F 1/1615; G06F 1/1616; G06F 1/1624; G06F 1/1633; G06F 1/1652; G06F 1/1681
See application file for complete search history.

(56) References Cited

U.S. PATENT DOCUMENTS 8,707,516 B2 4/2014 Koyama et al.
9,625,948 B2 4/2017 Zhang et al.
(Continued)

FOREIGN PATENT DOCUMENTS

KR 10-2018-0040968 4/2018
KR 10-2018-0094172 8/2018
KR 10-2019-0001864 1/2019

OTHER PUBLICATIONS

International Search Report and Written Opinion dated Feb. 8, 2021 in corresponding International Application No. PCT/KR2020/014166.

*Primary Examiner* — Anthony Q Edwards
(74) *Attorney, Agent, or Firm* — Nixon & Vanderhye, P.C.

(57) ABSTRACT

An electronic device includes: a first housing, a second housing, a display, at least a portion of which is disposed on the first housing and the second housing, a hinge disposed between the first housing and the second housing and overlapping the first housing and the second housing, the first housing and the second housing configured to be folded or unfolded based on a folding operation or an unfolding operation of the hinge, and a fiber structure including at least one fiber disposed in a portion where the first housing or the second housing and the hinge overlap each other. The hinge includes a multi-joint arrangement bendable in a specified curve form, a first sliding part coupled to one side of the multi joint arrangement and configured to move inside or outside the first housing based on a folding or unfolding operation of the multi-joint arrangement, and a second sliding part coupled to another side of the multi-joint structure and configured to move inside or outside the second housing based on the folding or unfolding operation of the multi joint arrangement. The fiber structure includes a fiber part including at least one fiber, at least a portion of which contacts the first sliding part or the second sliding part, the fiber part configured to be deformed based on a movement of the first sliding part or the second sliding part, and a base that fixes the fiber part.

20 Claims, 14 Drawing Sheets

(56) References Cited

U.S. PATENT DOCUMENTS

| | | |
|---|---|---|
| 10,306,783 B2 | 5/2019 | Seo et al. |
| 2009/0178240 A1 | 7/2009 | Koyama et al. |
| 2016/0179236 A1* | 6/2016 | Shin .................... G06F 3/04817 345/173 |
| 2016/0324023 A1* | 11/2016 | Kim ...................... G06F 1/1677 |
| 2017/0060183 A1 | 3/2017 | Zhang et al. |
| 2017/0208157 A1* | 7/2017 | Kim ...................... G06F 1/1652 |
| 2018/0110139 A1 | 4/2018 | Seo et al. |
| 2019/0032380 A1 | 1/2019 | Wu et al. |
| 2021/0191472 A1* | 6/2021 | Kim ....................... G06F 1/162 |

* cited by examiner

FOLDABLE ELECTRONIC DEVICE HAVING DUSTPROOF STRUCTURE

CROSS-REFERENCE TO RELATED APPLICATION

This application is based on and claims priority under 35 U.S.C. § 119 to Korean Patent Application No. 10-2019-0130254, filed on Oct. 18, 2019, in the Korean Intellectual Property Office, the disclosure of which is incorporated by reference herein its entirety.

BACKGROUND

1. Field

The disclosure relates to a foldable electronic device having a dustproof structure.

2. Description of Related Art

A foldable electronic device may be folded or unfolded. In a case where the foldable electronic device is unfolded, a user may use a wide display screen. In a case where the foldable electronic device is folded, the user may conveniently hold or move the foldable electronic device.

The foldable electronic device may be folded or unfolded through a hinge module (or, a hinge structure). For a smooth operation of the hinge module, a gap may be maintained between the hinge module and the housing of the foldable electronic device. In this case, foreign matter may infiltrate into the foldable electronic device from the outside through the gap.

In a case where foreign matter infiltrates into the foldable electronic device, the foreign matter may hamper an operation of the hinge module and may therefore cause a malfunction or failure in the hinge module. Furthermore, the foreign matter may cause a defect in a display (e.g., a stabbed mark or a projection on the display, or deformation of the display).

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Embodiments of the disclosure provide a foldable electronic device for preventing and/or reducing infiltration of foreign matter using a fiber structure around a hinge module.

In accordance with an example embodiment of the disclosure, an electronic device includes: a first housing, a second housing, a display, at least a portion of which is disposed on the first housing and the second housing, a hinge disposed between the first housing and the second housing and overlapping the first housing and the second housing, the first housing and the second housing configured to be folded or unfolded based on a folding operation or an unfolding operation of the hinge, and a fiber structure disposed in a portion where the first housing or the second housing and the hinge module overlap each other. The hinge includes a multi-joint arrangement bendable in a specified curve form, a first sliding part coupled to one side of the multi-joint arrangement and configured to move inside or outside the first housing based on a folding or unfolding operation of the multi-joint arrangement, and a second sliding part coupled to another side of the multi-joint structure and configured to move inside or outside the second housing based on the folding or unfolding operation of the multi-joint arrangement. The fiber structure includes a fiber part, at least a portion of which makes contact with the first sliding part or the second sliding part, the fiber part configured to be deformed based on a movement of the first sliding part or the second sliding part, and a base fixing the fiber part.

Other aspects, advantages, and salient features of the disclosure will be apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Hereinafter, various example embodiments of the disclosure may be described with reference to accompanying drawings. Those of ordinary skill in the art will recognize that modifications, equivalents, and/or alternatives on the various example embodiments described herein can be vari- FIG. 1 is a diagram illustrating an unfolded state of an example foldable electronic device according to various embodiments.

Figure 1:
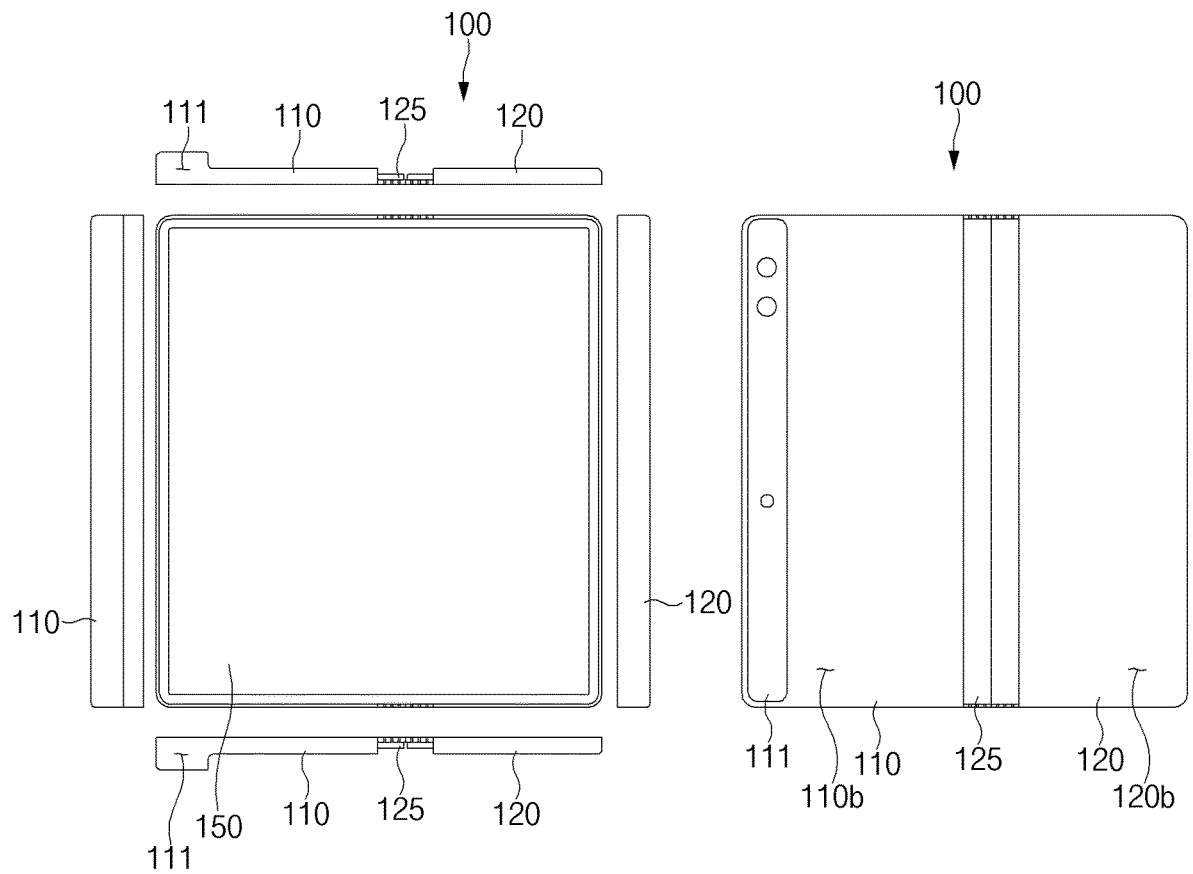
FIG. 1 is a diagram illustrating an unfolded state of an example foldable electronic device according to various embodiments.

Referring to FIG. 1, the foldable electronic device 100 may include a first housing (or, a first main body) 110, a second housing (or, a second main body) 120, a hinge module (or, a hinge structure, a center-of-rotation part, or a connecting part) 125, and a display 150. The foldable electronic device 100 may be a device that is folded or unfolded by rotation of the first housing 110 or the second housing 120 about the hinge module 125.

The first housing 110 and the second housing 120 may be unfolded to form a substantially flat surface (hereinafter, referred to as an unfolded state). In the unfolded state, the angle between the first housing 110 and the second housing 120 may be, for example, 180 degrees.

According to various embodiments, the first housing 110 and the second housing 120 may have different forms. The first housing 110 and the second housing 120 may have the same length in a first direction (e.g., a lengthwise direction or a direction parallel to the hinge module 125) and may have different widths in a second direction (e.g., a width direction or a direction perpendicular to the hinge module 125). For example, the first housing 110 may have a greater width than the second housing 120.

According to various embodiments, the first housing 110 and the second housing 120 may have the display 150 mounted on first surfaces thereof. The display 150 may be bendable in an area adjacent to or near the hinge module 125. According to an embodiment, the display 150 may cover the entire areas of the first surfaces of the first housing 110 and the second housing 120.

According to various embodiments, the first housing 110 may include a protrusion 111 on a second surface 110b thereof. The protrusion 111 may protrude from the second surface 110b of the first housing 110. The protrusion 111 may be continually exposed to the outside even when the first housing 110 and the second housing 120 are folded. The protrusion 111 may have a lens unit of a camera module or a sensing window of a sensor module disposed therein. The following description will be given based on the form in which the first housing 110 includes the protrusion 111. However, the disclosure is not limited thereto.

According to various embodiments, at least a portion of the hinge module 125 may be exposed between the second surface 110b of the first housing 110 and a second surface of the second housing 120. A cover for hiding at least a portion of the hinge module 125 may be provided on the second surfaces 110b and 120b of the first housing 110 and the second housing 120.

On a rear surface (an opposite surface to an active area on which contents are output) of the display 150, the hinge module 125 may be disposed between the first housing 110 and the second housing 120. The first housing 110 and the second housing 120 may be folded or unfolded in response to a change in the form of the hinge module 125.

According to various embodiments, a gap may be formed between the hinge module 125 and an inner surface of the first housing 110, and a gap may be formed between the hinge module 125 and an inner surface of the second housing 120. Portions (e.g., sliding parts) of the hinge module 125 may move inside or outside the first housing 110 and the second housing 120 through the gaps, respectively.

According to various embodiments, the display 150 may be bendable in an area adjacent to the hinge module 125. The curvature at which the display 150 is bent may be determined based on a curved form or structure in which the hinge module 125 is folded.

Although FIG. 1 illustrates an example that the foldable electronic device 100 is folded in a left/right direction (V-folding), the disclosure is not limited thereto. For example, the foldable electronic device 100 may be folded in an up/down direction (H-folding).

Although FIG. 1 illustrates an example that the foldable electronic device 100 is folded once about the hinge module 125, the disclosure is not limited thereto. For example, the foldable electronic device 100 may be a device that is folded multiple times using a plurality of hinge modules.

Figure 2:
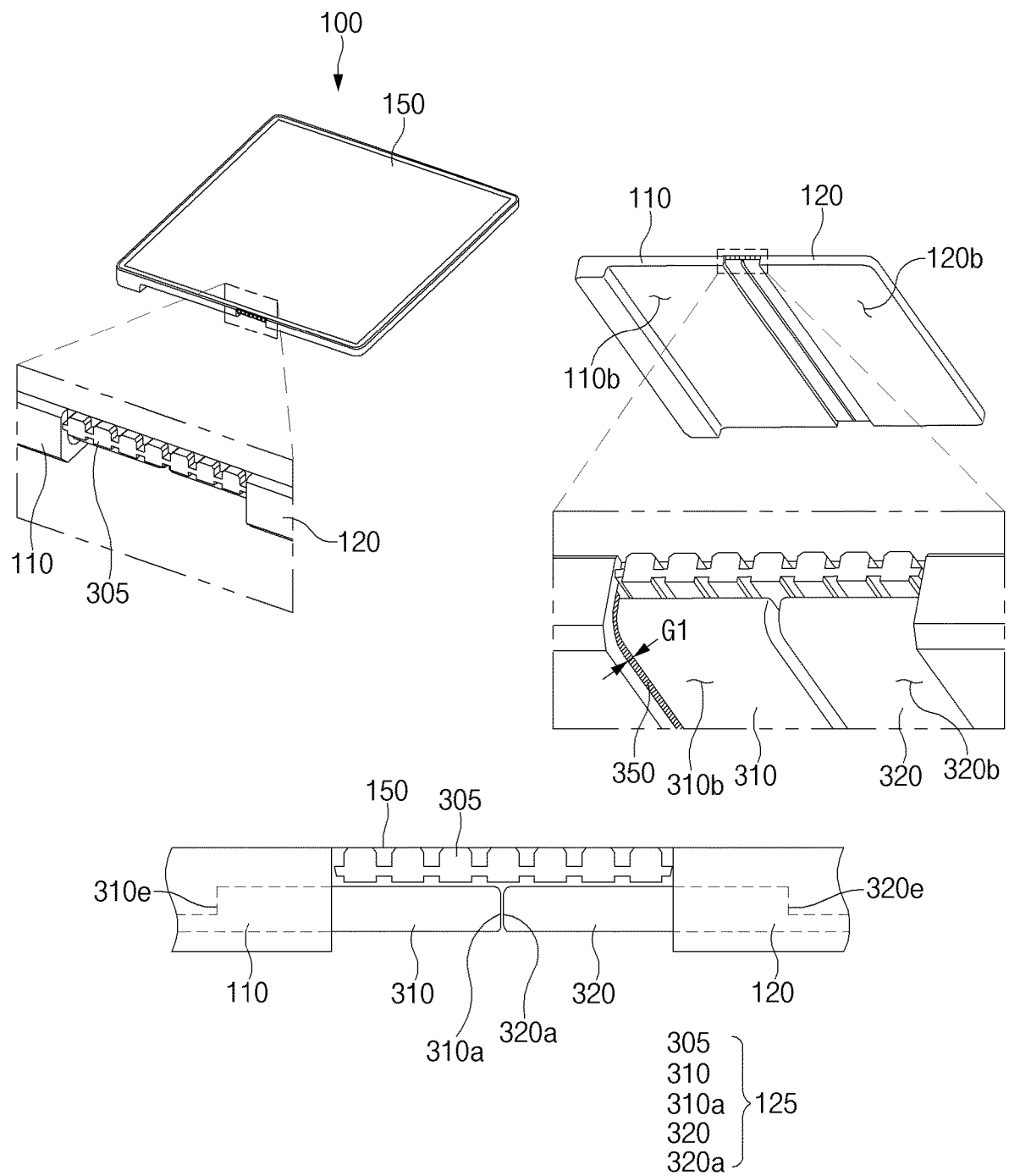
FIG. 2 is a diagram illustrating an example hinge module in an unfolded state according to various embodiments.

FIG. 2 is a diagram illustrating an example hinge module in an unfolded state according to various embodiments.

Referring to FIG. 2, the hinge module 125 may be disposed between the first housing 110 and the second housing 120. The first housing 110 and the second housing 120 may be folded or unfolded depending on a change in the form of the hinge module 125.

According to various embodiments, the hinge module 125 may include a multi-joint structure 305, a first sliding part 310, and a second sliding part 320.

On the rear surface (the opposite surface to the active area on which contents are output) of the display 150, the multi joint structure 305 may be disposed between the first housing 110 and the second housing 120. The curvature at which the display 150 is bent may be determined based on a curved form or structure in which the multi-joint 305 is folded.

The first sliding part 310 may be disposed between the multi-joint structure 305 and the inner surface of the first housing 110. In the unfolded state, a portion of the first sliding part 310 may be disposed inside the first housing 110, and another portion of the first sliding part 310 may be exposed outside the first housing 110. At least a portion of the first sliding part 310 may be coupled with the multi joint structure 305, and the first sliding part 310 may gradually move into the first housing 110 depending on a folding operation.

The second sliding part 320 may be disposed between the multi joint structure 305 and the inner surface of the second housing 120. In the unfolded state, a portion of the second sliding part 320 may be disposed inside the second housing 120, and another portion of the second sliding part 320 may be exposed outside the second housing 120. At least a portion of the second sliding part 320 may be coupled with the multi-joint structure 305, and the second sliding part 320 may gradually move into the second housing 120 depending on a folding operation.

According to various embodiments, in the unfolded state, an end portion 310a of the first sliding part 310 may make contact with, or may be close to, an end portion 320a of the second sliding part 320. Depending on a folding operation, the end portion 310a of the first sliding part 310 and the end portion 320a of the second sliding part 320 may move away from each other.

According to various embodiments, a first gap G1 may be formed between a first surface 310b of the first sliding part 310 and the inner surface of the first housing 110. In a case where the first gap G1 is not formed, a folding or unfolding operation may not be smoothly performed due to friction with the inner surface of the first housing 110 during a movement of the first sliding part 310. The first gap G1 may be formed within a specified range (e.g., about 1 mm).

According to various embodiments, a second gap G2 (not illustrated) may be formed between a first surface 320b of the second sliding part 320 and the inner surface of the second housing 120. In a case where the second gap G2 (not illustrated) is not formed, a folding or unfolding operation may not be smoothly performed due to friction with the inner surface of the second housing 120 during a movement of the second sliding part 320. The second gap G2 (not illustrated) may be formed within a specified range (e.g., about 1 mm).

According to various embodiments, the first sliding part 310 may include a step structure 310e. The step structure 310e may prevent and/or reduce the first sliding part 310 from colliding with surrounding components (e.g., a printed circuit board (PCB)) when moving into the first housing 110. The second sliding part 320 may include a step structure 320e. The step structure 320e may prevent and/or reduce the second sliding part 320 from colliding with surrounding components (e.g., a printed circuit board) when moving into the second housing 120.

According to various embodiments, a fiber structure (or, a dustproof structure) 350 may be disposed in the first gap G1 or the second gap G2 (not illustrated). The fiber structure 350 may prevent and/or reduce infiltration of foreign matter (e.g., dust, liquid particles, solid granules, or the like) into the first housing 110 or the second housing 120 through the first gap G1 or the second gap G2 (not illustrated). In a case where foreign matter infiltrates into the first housing 110 or the second housing 120, the foreign matter may hamper a normal operation of the hinge module 125 and may cause a defect in the display 150. According to an embodiment, the fiber structure 350 may include movable fibers and a base for fixing the fibers. The fibers may make contact with the first sliding part 310 or the second sliding part 320. The base may be attached to the inner surface of the first housing 110 or the second housing 120. Additional information about the fiber structure 350 may be provided through FIGS. 5, 6A, 6B, 7, 8, 9, 10, 11 and 12.

Figure 3:
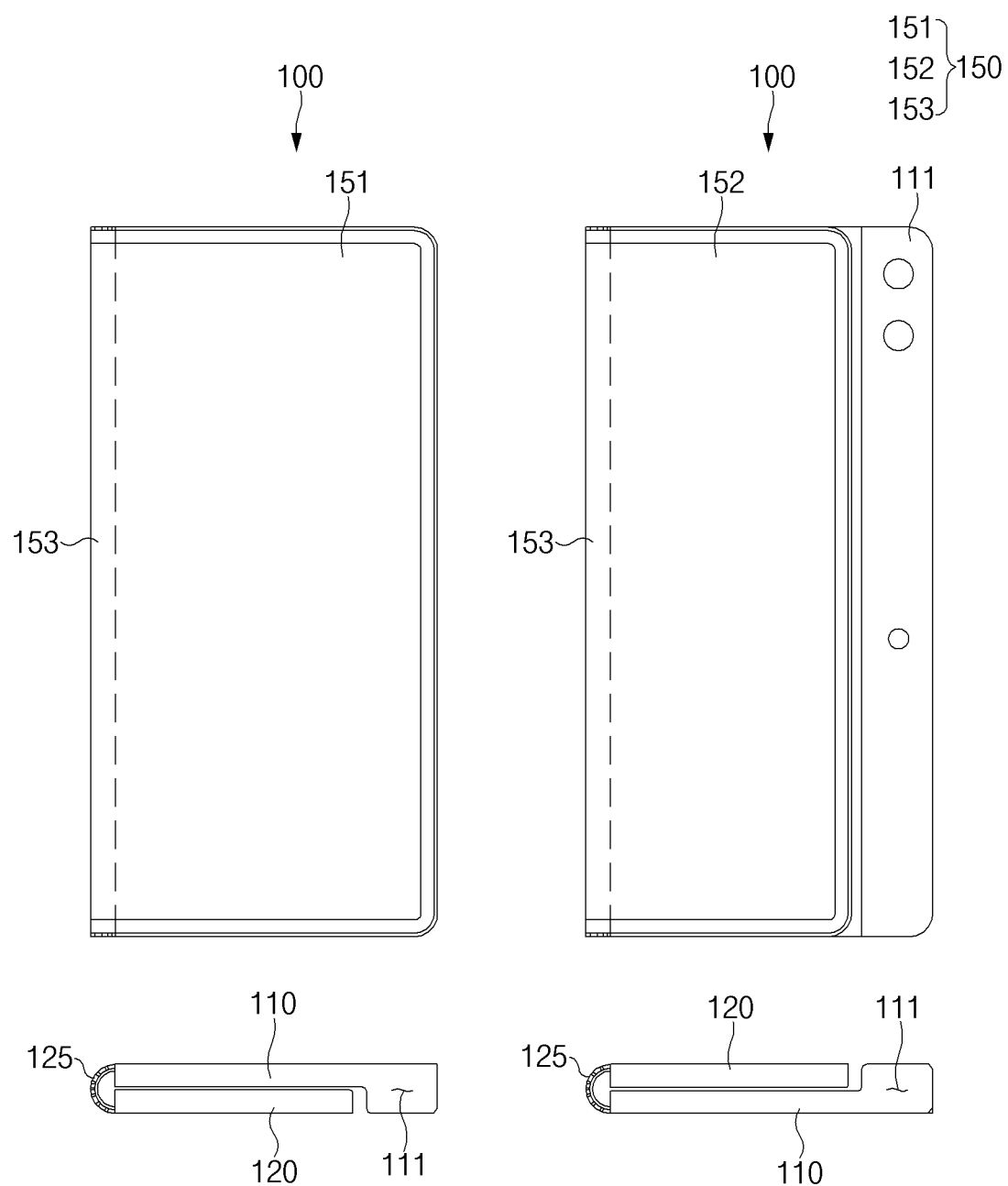
FIG. 3 is a diagram illustrating a folded state of the foldable electronic device according to various embodiments.

FIG. 3 is a diagram illustrating an example folded state of the foldable electronic device according to various embodiments.

Referring to FIG. 3, the foldable electronic device 100 may be folded by rotation of the first housing 110 or the second housing 120 about the hinge module 125. In a case where the first housing 110 and the second housing 120 make contact with each other, the angle between the first housing 110 and the second housing 120 may be, for example, 0 degrees (hereinafter, referred to as a fully folded state).

According to various embodiments, the first housing 110 may include the protrusion 111. In the fully folded state, the protrusion 111 may be continually exposed to the outside. In the fully folded state, the lens unit of the camera module or the sensing window of the sensor module disposed in the protrusion 111 may also be continually exposed to the outside.

According to various embodiments, the display 150 may be bent in an area adjacent to the hinge module 125. The display 150 may include a first display area 151, a second display area 152, and a flexible area 153. The first display area 151 may be mounted on the first housing 110. The second display area 152 may be mounted on the second housing 120. The flexible area 153 may be adjacent to the hinge module 125 and may be bent when the first housing 110 and the second housing 120 are folded. The curvature at which the flexible area 153 is bent may be determined based on a curved form or structure in which the hinge module 125 is folded. Additional information about a process of folding the first housing 110 and the second housing 120 may be provided through FIG. 4.

Figure 4:
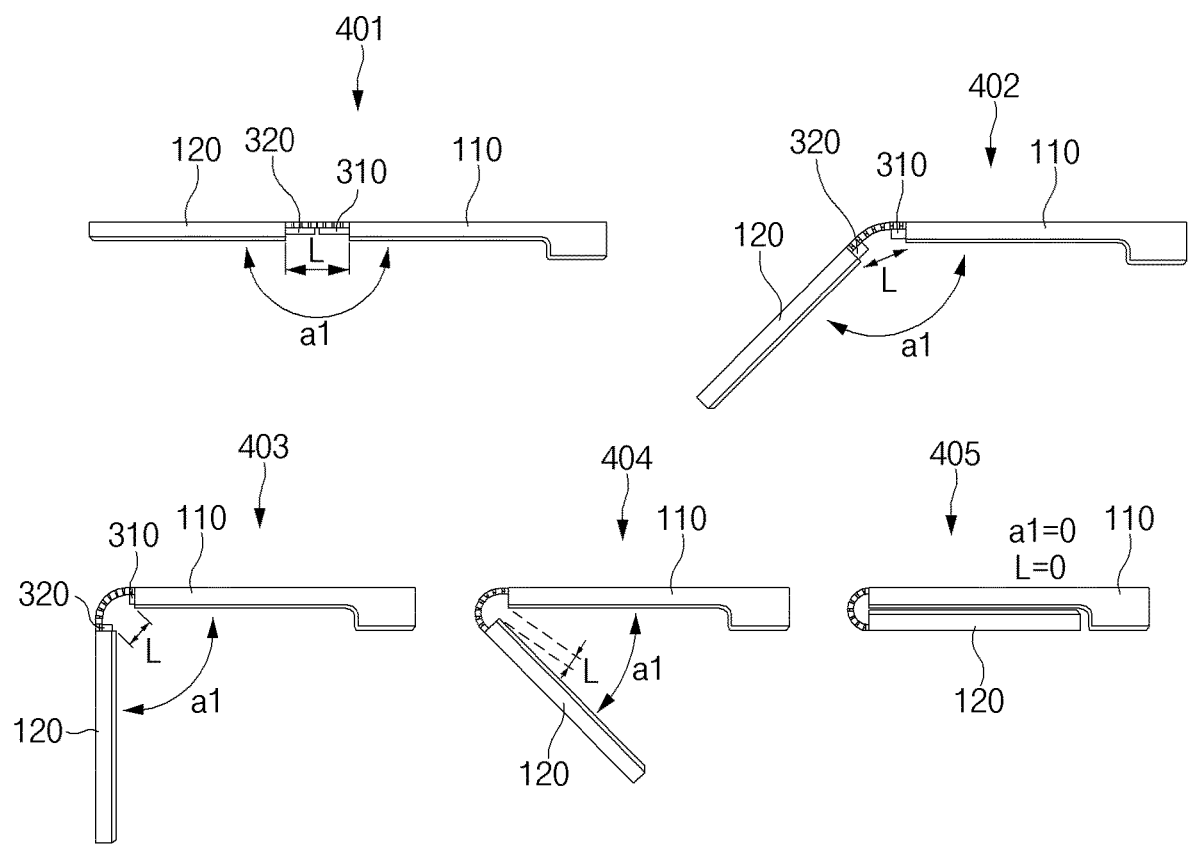
FIG. 4 is a diagram illustrating an example folding operation of the foldable electronic device according to various embodiments.

FIG. 4 is a diagram illustrating an example folding operation of the foldable electronic device according to various embodiments.

Referring to FIG. 4, in an unfolded state 401, the first housing 110 and the second housing 120 may be unfolded to face substantially the same direction. In the unfolded state 401, the distance L between the first housing 110 and the second housing 120 may be greater than that in a first partially folded state 402, a second partially folded state 403, a third partially folded state 404, or a fully folded state 405. The folding angle a1 may be 180 degrees.

In the unfolded state 401, the portion of the first sliding part 310 may be disposed inside the first housing 110, and the other portion of the first sliding part 310 may be exposed outside the first housing 110. Furthermore, the portion of the second sliding part 320 may be disposed inside the second housing 120, and the other portion of the second sliding part 320 may be exposed outside the second housing 120.

In the first partially folded state 402, the folding angle a1 may be an obtuse angle (e.g., about 160 degrees). For example, the folding angle a1 may be between 180 degrees and 90 degrees. In the second partially folded state (or, the vertical state) 403, the folding angle a1 may be 90 degrees. In the third partially folded state 404, the folding angle a1 may be an acute angle (e.g., about 30 degrees). For example, the folding angle a1 may be between 90 degrees and 0 degrees.

In a process of changing from the first partially folded state 402 to the third partially folded state 403, the first sliding part 310 may gradually move into the first housing 110. The exposed portion of the first sliding part 310 may be gradually reduced. Furthermore, the second sliding part 320 may gradually move into the second housing 120. The exposed portion of the second sliding part 320 may be gradually reduced. The distance L between the first housing 110 and the second housing 120 may be smaller than that in the unfolded state 401.

In the fully folded state 405, the folding angle a1 may be 0 degrees. The first housing 110 and the second housing 120 may make contact with each other, and the distance L between the first housing 110 and the second housing 120 may be 0.

According to various embodiments, in a process of changing from the unfolded state 401 to the fully folded state 405, foreign matter attached to the first sliding part 310 or the second sliding part 320 may infiltrate into the first housing 110 or the second housing 120.

The fiber structure 350 (refer to FIG. 2) disposed between the first sliding part 310 and the inner surface of the first housing 110 or between the second sliding part 320 and the inner surface of the second housing 120 may remove or block the foreign matter.

Figure 5:
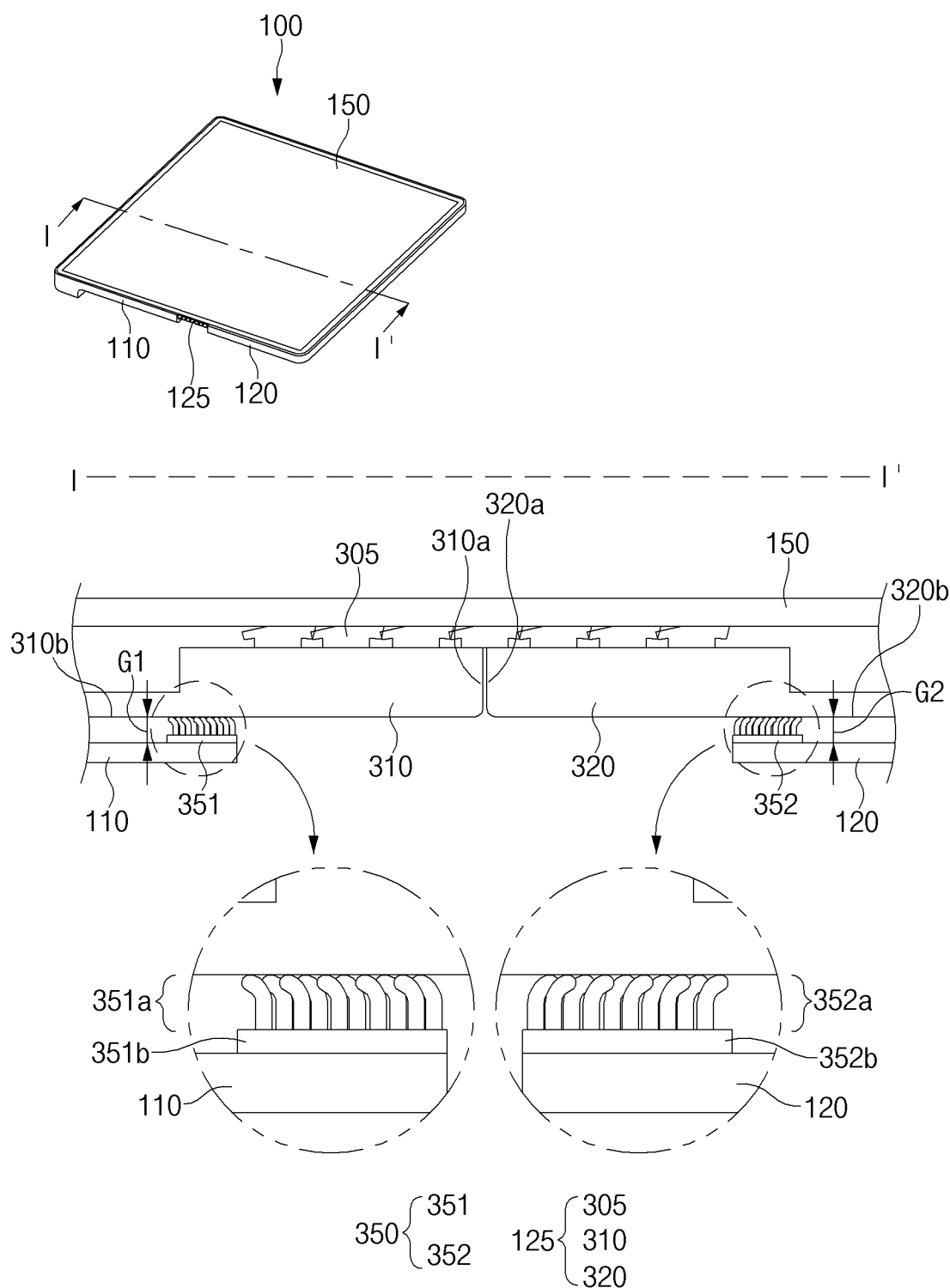
FIG. 5 is a sectional view of the foldable electronic device according to various embodiments.

FIG. 5 is a sectional view of the foldable electronic device according to various embodiments.

Referring to FIG. 5, the foldable electronic device 100 may include the first housing 110, the second housing 120, the hinge module 125, and the display 150.

In a sectional view taken along line I-I', the hinge module 125 may include the multi-joint structure 305, the first sliding part 310, and the second sliding part 320.

The multi joint structure 305 may be disposed under the display 150 (e.g., on the opposite surface to the active area). The display 150 may be flexible in an area adjacent to the multi joint structure 305. The curvature at which the display 150 is bent may be determined based on a curved form or structure in which the multi-joint 305 is folded.

The first sliding part 310 may be disposed between the multi-joint structure 305 and the inner surface of the first housing 110. In an unfolded state, the portion of the first sliding part 310 may be disposed inside the first housing 110, and the other portion of the first sliding part 310 may be exposed outside the first housing 110.

The second sliding part 320 may be disposed between the multi joint structure 305 and the inner surface of the second housing 120. In the unfolded state, the portion of the second sliding part 320 may be disposed inside the second housing 120, and the other portion of the second sliding part 320 may be exposed outside the second housing 120.

In the unfolded state, the end portion 310a of the first sliding part 310 may make contact with, or may be close to, the end portion 320a of the second sliding part 320. Depending on a folding operation, the end portion 310a of the first sliding part 310 and the end portion 320a of the second sliding part 320 may move away from each other.

According to various embodiments, the first gap G1 may be formed between the first surface 310b of the first sliding part 310 and the inner surface of the first housing 110. The first gap G1 may be formed within a specified range (e.g., about 1 mm). Furthermore, the second gap G2 may be formed between the first surface 320b of the second sliding part 320 and the inner surface of the second housing 120. The second gap G2 may be formed within a specified range (e.g., about 1 mm).

According to various embodiments, the fiber structure 350 may be disposed in the first gap G1 and/or the second gap G2. The fiber structure 350 may prevent and/or reduce infiltration of foreign matter (e.g., dust, liquid particles, solid granules, or the like) into the first housing 110 or the second housing 120 through the first gap G1 or the second gap G2. In a case where foreign matter infiltrates into the first housing 110 or the second housing 120, the foreign matter may hamper a normal operation of the hinge module 125 and may cause a defect in the display 150 (e.g., a stabbed mark or a projection on the display 150, or deformation of the display 150).

According to various embodiments, the fiber structure 350 may include fiber parts 351a and 352a and bases 351b and 352b.

The fiber parts 351a and 352a may be deformed depending on a movement of the first sliding part 310 or the second sliding part 320. First portions (upper portions) of the fiber parts 351a and 352a may make contact with the first sliding part 310 or the second sliding part 320 and may have a form with a curved end rather than a straight form. Second portions (lower portions) of the fiber parts 351a and 352a may be fixed to the bases 351b and 352b.

According to various embodiments, fibers of the fiber parts 351a and 352a may be implemented with at least one of various fibers, such as, for example, and without limitation, a synthetic fiber, a natural fiber, an optical fiber, a glass fiber, and the like, and may be implemented with a hybrid fiber as needed.

According to various embodiments, a pattern of holes of the bases 351b and 352b into which the fibers of the fiber parts 351a and 352a are fixedly inserted may have various arrangements such as, for example, and without limitation, a zigzag pattern arrangement, a matrix or grid arrangement, a combination of a grid arrangement and a zigzag pattern arrangement, a random arrangement, and the like.

The fiber parts 351a and 352a may prevent and/or reduce foreign matter attached to the first sliding part 310 or the second sliding part 320 from infiltrating into the first housing 110 or the second housing 120. The foreign matter may be attached to the fiber parts 351a and 352a, or may fall to the outside.

The bases 351b and 352b may fix the fiber parts 351a and 352a. The bases 351b and 352b may be fixed to the inner surface of the first housing 110 or the inner surface of the second housing 120 through an adhesive (e.g., a double-sided tape, or the like).

Figure 6A:
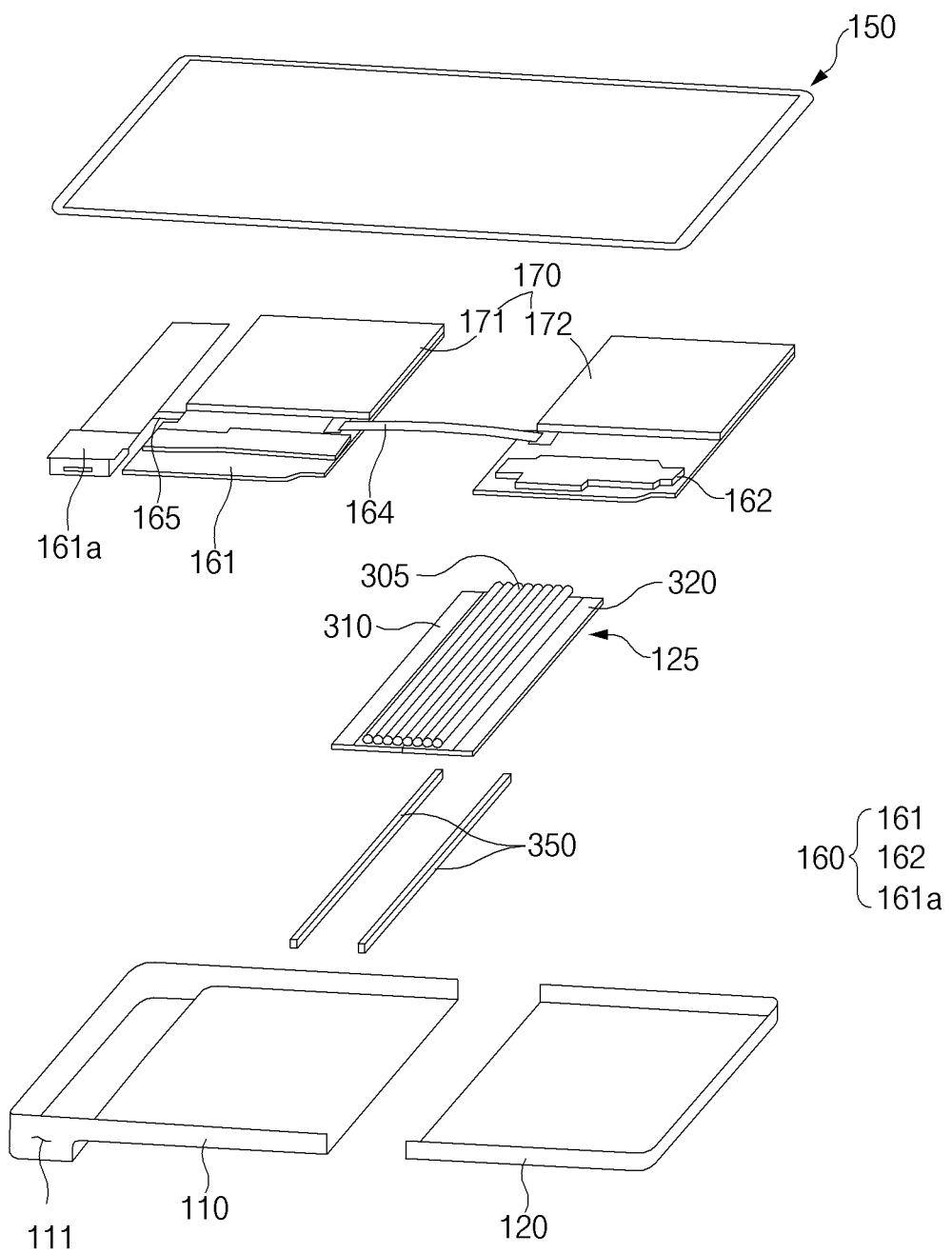
FIG. 6A is an exploded perspective view of the foldable electronic device according to various embodiments.

FIG. 6A is an exploded perspective view of the foldable electronic device according to various embodiments.

Referring to FIG. 6A, the foldable electronic device 100 may include the first housing 110, the second housing 120, the hinge module 125, the display 150, a printed circuit board 160, a battery 170, and the fiber structure 350.

In an unfolded state, the display 150 may occupy all or most of a first surface (a front surface) of the foldable electronic device 100. The display 150 may be flexible in an area adjacent to hinge module 125.

The hinge module 125 may be disposed under the display 150. The display 150 may be bent to correspond to a form in which the hinge module 125 is bent.

According to various embodiments, the hinge module 125 may be disposed between a first PCB 161 and a second PCB 162. The hinge module 125 may be disposed so as not to overlap the first PCB 161 or the second PCB 162 of the printed circuit board 160. Accordingly, the thickness of the foldable electronic device 100 may be reduced. Furthermore, the hinge module 125 may be disposed between a first battery 171 and a second battery 172. The hinge module 125 may be disposed so as not to overlap the first battery 171 or the second battery 172. Accordingly, the thickness of the foldable electronic device 100 may be reduced.

The printed circuit board 160 may include the first PCB 161, a sub-PCB 161a, the second PCB 162, and connecting parts (or, FPCBs) 164 and 165. Various elements or chips required for operations of the foldable electronic device 100 may be mounted on the printed circuit board 160.

The first PCB 161 may be contained in the first housing 110. The second PCB 162 may be contained in the second housing 120. The second PCB 162 may be electrically connected with the first PCB 161 through the first connecting part (or FPCB) 164. The sub-PCB 161a may be contained in the protrusion 111 of the first housing 110. The sub-PCB 161a may have elements (e.g., the camera module or the sensor module) mounted thereon and may electrically connect the elements. The sub-PCB 161a may be electrically connected with the first PCB 161 through the second connecting part (or FPCB) 165.

The battery 170 may include the first battery 171 contained in the first housing 110 and the second battery 172 contained in the second housing 120. The battery 170 may supply electric power required to operate the foldable electronic device 100. The battery 170 may be recharged by an external power supply.

The fiber structure 350 may be attached to the inner surface of the first housing 110 or the inner surface of the second housing 120. The fiber structure 350 may include the fiber parts 351a and 352a that can be deformed by pressure. The fiber parts 351a and 352a may be mounted in a state of making contact with the first sliding part 310 and the second sliding part 320 of the hinge module 125.

Figure 6B:
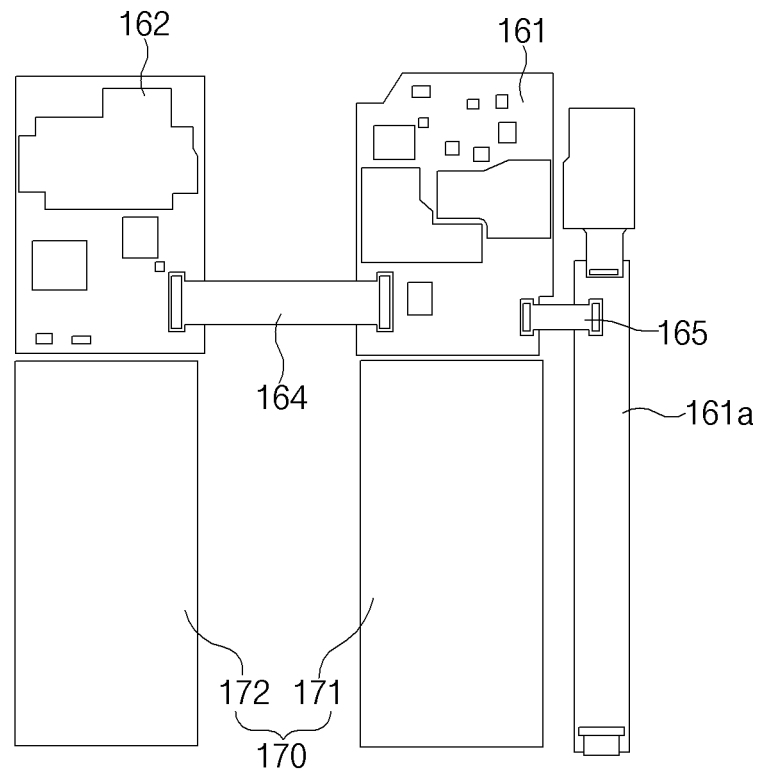
FIG. 6B is a diagram illustrating an example printed circuit board and a battery according to various embodiments.
Figure 6B:
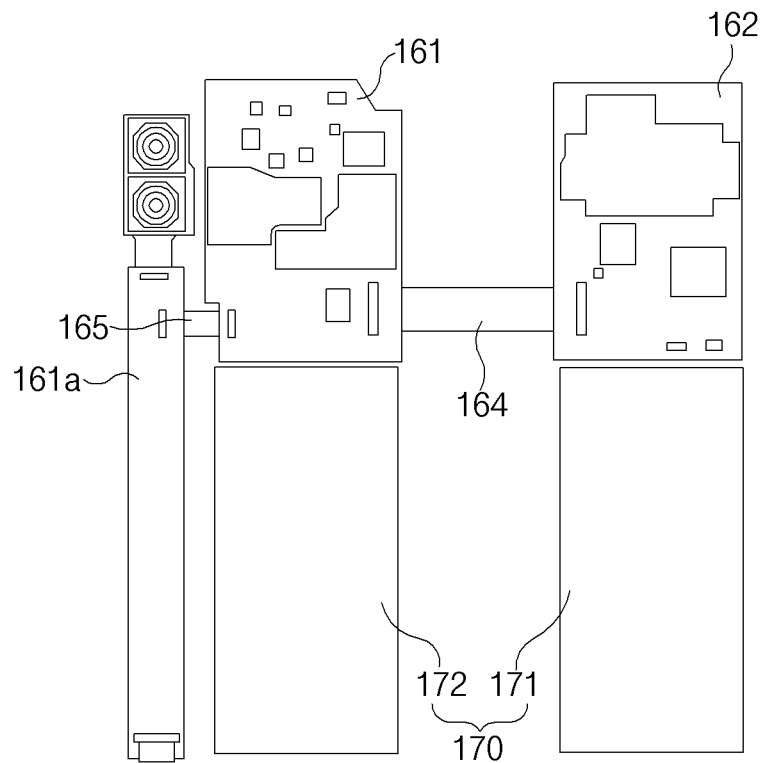

FIG. 6B is a diagram illustrating the printed circuit board and the battery according to various embodiments.

Referring to FIG. 6B, the printed circuit board 160 may include the first PCB 161, the sub-PCB 161a, the second PCB 162, the first connecting part (or, FPCB) 164, and the second connecting part (or, FPCB) 165. Various elements or chips required for operations of the foldable electronic device 100 may be mounted on the printed circuit board 160.

The first PCB 161 may be contained in the first housing 110, and the second PCB 162 may be contained in the second housing 120. The first PCB 161 and the second PCB 162 may be spaced apart from each other by a specified distance. The connecting part 164 may electrically connect the first PCB 161 and the second PCB 162.

The hinge module 125 or the fiber structure 350 may be disposed between the first PCB 161 and the second PCB 162. The hinge module 125 or the fiber structure 350 may be disposed so as not to overlap the first PCB 161 and the second PCB 162. Accordingly, the overall thickness of the foldable electronic device 100 may be reduced.

The sub-PCB 161a may be contained in the protrusion 111 of the first housing 110. The sub-PCB 161a may have elements (e.g., the camera module or the sensor module) mounted thereon and may electrically connect the elements. The sub-PCB 161a may be electrically connected with the first PCB 161 through the second connecting part 165.

The battery 170 may include the first battery 171 contained in the first housing 110 and the second battery 172 contained in the second housing 120. The hinge module 125 or the fiber structure 350 may be disposed between the first battery 171 and the second battery 172. The hinge module 125 or the fiber structure 350 may be disposed so as not to overlap the first battery 171 and the second battery 172. Accordingly, the overall thickness of the foldable electronic device 100 may be reduced.

Figure 7:
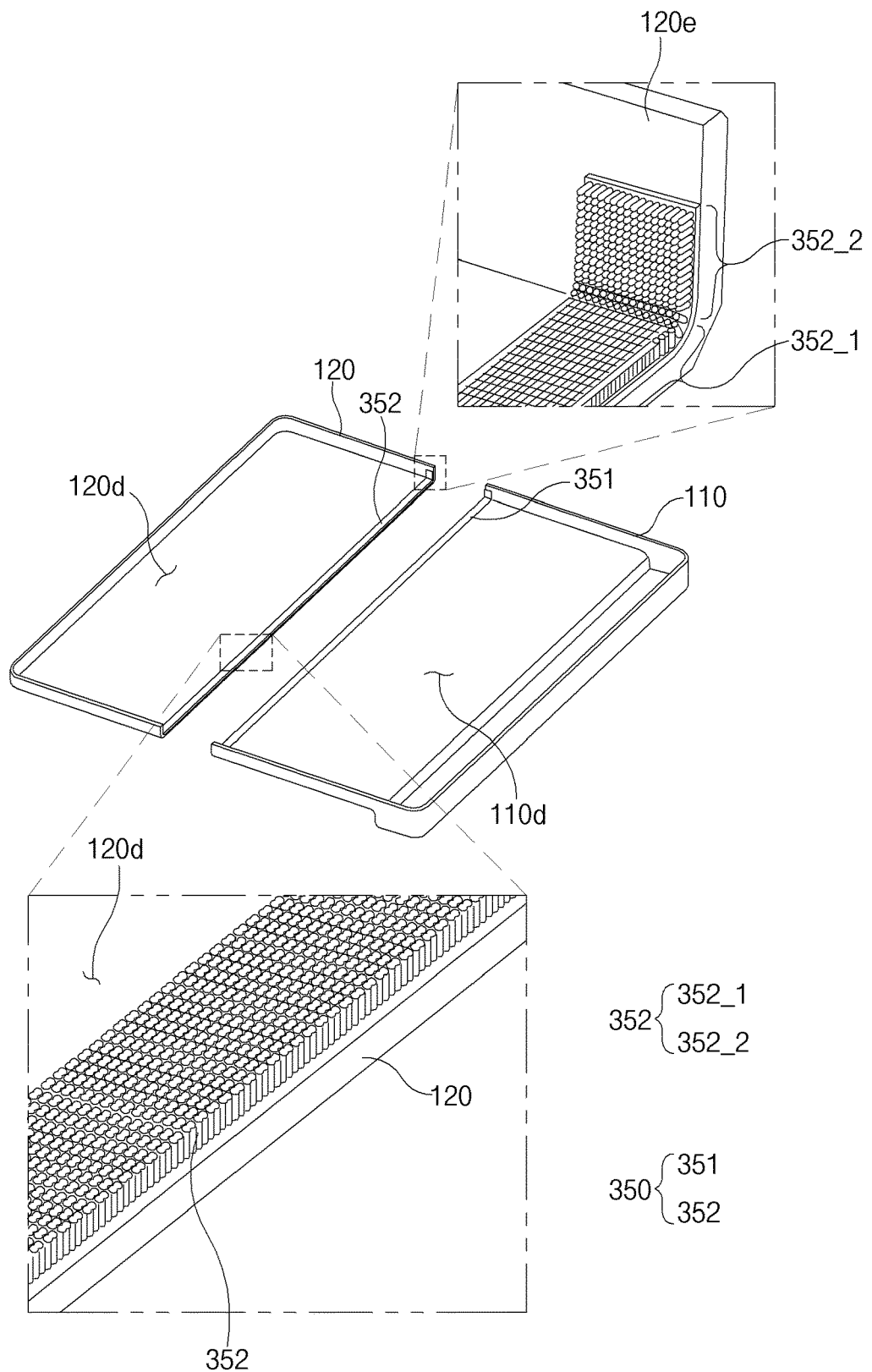
FIG. 7 is a diagram illustrating example attachment of a fiber structure according to various embodiments.

FIG. 7 is a diagram illustrating example attachment of the fiber structure according to various embodiments.

Referring to FIG. 7, a first fiber structure 351 may be attached to an inner surface 110d of the first housing 110. The base 351b (refer to FIG. 5) of the first fiber structure 351 may be attached to the inner surface 110d of the first housing 110 through an adhesive (e.g., a double-sided tape). Furthermore, a second fiber structure 352 may be attached to an inner surface 120d of the second housing 120. The base 352b (refer to FIG. 5) of the second fiber structure 352 may be attached to the inner surface 120d of the second housing 120 through an adhesive (e.g., a double-sided tape).

According to various embodiments, the first fiber structure 351 may be attached to a plurality of inner surfaces of the first housing 110. Furthermore, the second fiber structure 352 may be attached to a plurality of inner surfaces of the second housing 120. For example, a first portion 352_1 of the second fiber structure 352 may be attached to the first inner surface (e.g., the rear surface) 120d of the second housing 120, and a second portion 352_2 of the second fiber structure 352 may be attached to a second inner surface (e.g., an upper side surface) 120e of the second housing 120. In an embodiment, the height of the second portion 352_2 may correspond to a gap between the hinge module 125 and the second inner surface (e.g., the upper side surface) 120e of the second housing 120. In another embodiment, the second portion 352_2 may have a height sufficient to make contact with the rear surface of the display 150.

Although not illustrated in FIG. 7, a third portion of the second fiber structure 352 may be attached to a third inner surface (e.g., a lower side surface) of the second housing 120. The first fiber structure 351 may be attached to a plurality of inner surfaces of the first housing 110 in a similar manner.

Figure 8:
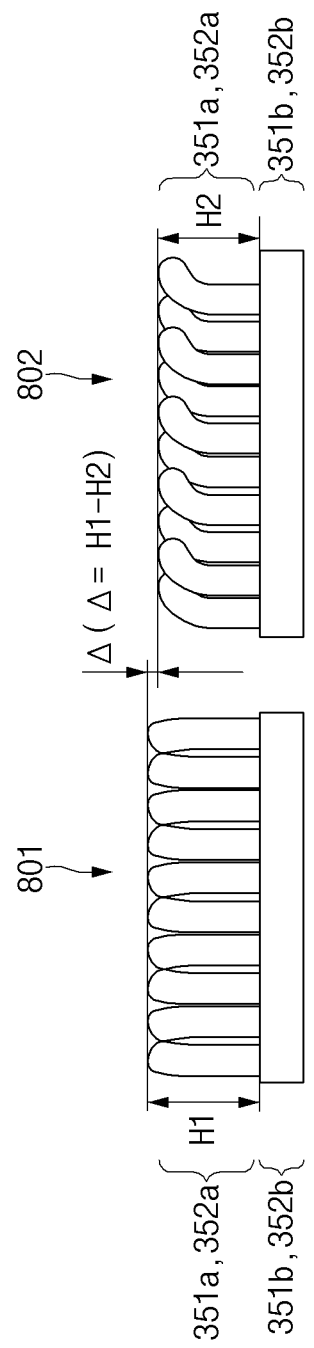
FIG. 8 is a diagram illustrating example deformation of the fiber structure according to various embodiments.

FIG. 8 is diagram illustrating example deformation of the fiber structure according to various embodiments.

Referring to FIG. 8, the fiber structure 350 may include the fiber parts 351a and 352a and the bases 351b and 352b. The fiber parts 351a and 352a may be moved and deformed by external pressure.

A default state 801 may be a state in which no external pressure is applied to the fiber parts 351a and 352a. In the default state 801, the fiber parts 351a and 352a may have a first height H1 (e.g., 0.7 mm). In the default state 801, the forms of the fiber parts 351a and 352a may vary depending on characteristics of the material thereof.

An external pressure state 802 may be a state in which external pressure is applied to the fiber parts 351a and 352a. For example, the external pressure state 802 may be a state in which the fiber structure 350 is mounted in the foldable electronic device 100 and the upper portions of the fiber parts 351a and 352a make contact with the first sliding part 310 or the second sliding part 320.

In the external pressure state 802, the fiber parts 351a and 352a may have a second height H2 (e.g., 0.3 mm) that is smaller than the first height H1. A form in which the fiber parts 351a and 352a are arranged or bent may be changed depending on a movement of the first sliding part 310 and the second sliding part 320 that makes contact with the upper portions of the fiber parts 351a and 352a. According to an embodiment, the first height H1 and the second height H2 may have the relation $H1*0.5 \geq H2$.

The fiber parts 351a and 352a may fill the space between the first sliding part 310 and the first housing 110 or the space between the second sliding part 320 and the second housing 120, thereby preventing and/or reducing infiltration of foreign matter into the foldable electronic device 100.

The bases 351b and 352b may fix the fiber parts 351a and 352a. The bases 351b and 352b may be attached to the inner surface of the first housing 110 and the inner surface of the second housing 120 through adhesives. The bases 351b and 352b may have a smaller height (e.g., 0.4 mm) than the fiber parts 351a and 352a.

The height of the bases 351b and 352b or the height of the fiber parts 351a and 352a may be variously applied. For example, the height of the bases 351b and 352b, the height of the fiber parts 351a and 352a in the default state, and the height of the fiber parts 351a and 352a in the external pressure state may be 0.4 mm, 0.7 mm, and 0.3 mm, respectively. In another example, the height of the bases 351b and 352b, the height of the fiber parts 351a and 352a in the default state, and the height of the fiber parts 351a and 352a in the external pressure state may be 0.2 mm, 0.4 mm, and 0.2 mm, respectively.

Figure 9:
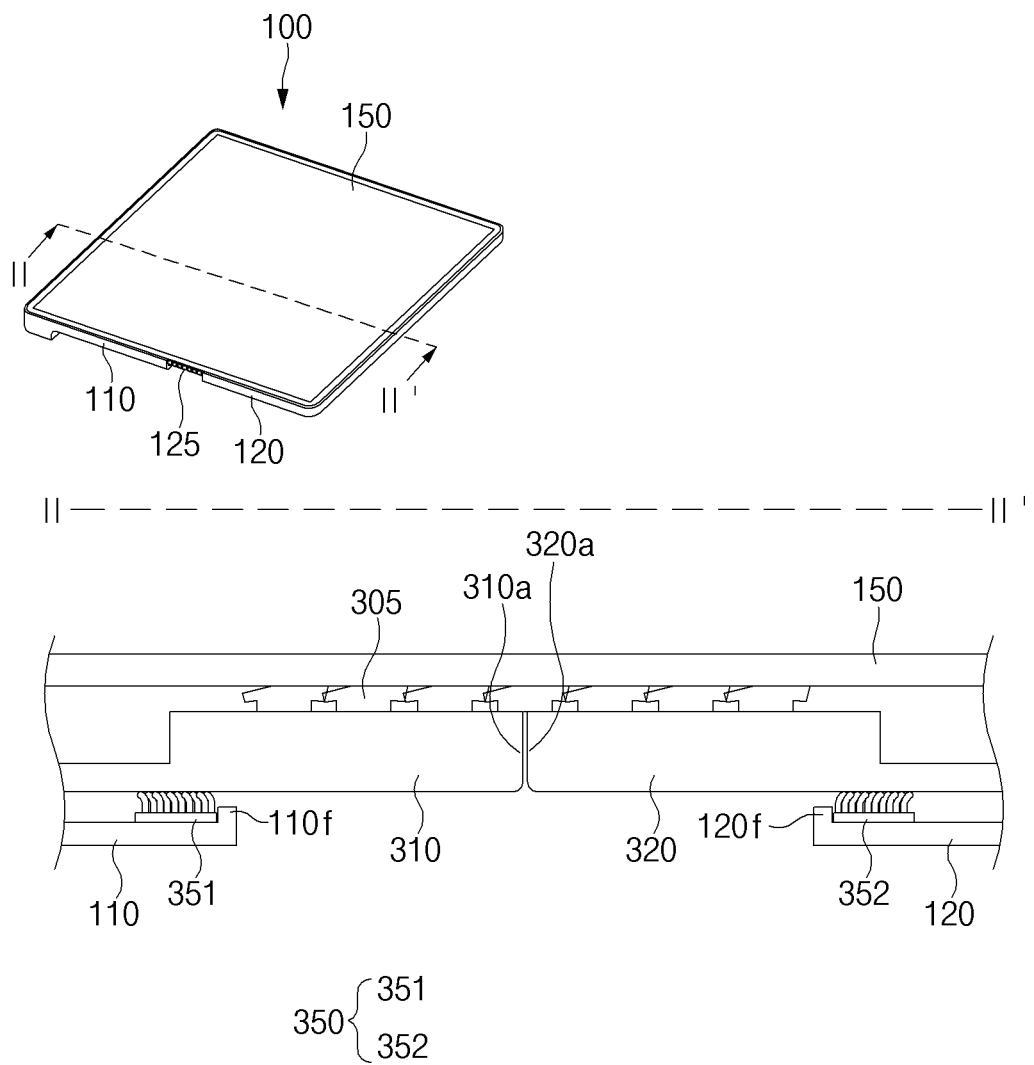
FIG. 9 is a diagram illustrating an example housing structure for preventing and/or reducing a fiber structure from being visible from the outside according to various embodiments.

FIG. 9 is a diagram illustrating an example housing structure for preventing and/or reducing a fiber structure from being visible from the outside according to various embodiments.

Referring to FIG. 9, the foldable electronic device 100 may include the first housing 110, the second housing 120, the hinge module 125, and the display 150.

The hinge module 125 may include the multi joint structure 105, the first sliding part 310, and the second sliding part 320.

The fiber structure 350 may include the first fiber structure 351 and the second fiber structure 352. The first fiber structure 351 may be disposed between the first sliding part 310 and the inner surface of the first housing 110. The first fiber structure 351 may prevent infiltration of foreign matter into the first housing 110. The second fiber structure 352 may be disposed between the second sliding part 320 and the inner surface of the second housing 120. The second fiber structure 352 may prevent and/or reduce infiltration of foreign matter into the second housing 120.

According to various embodiments, the first housing 110 may further include a first protrusion 110f. The first protrusion 110f may protrude from an end portion of the first housing 110 toward the first sliding part 310. The first protrusion 110f may prevent the first fiber structure 351 from being visible from the outside. The first protrusion 110f may be spaced part from the first sliding part 310 at a specified interval. Furthermore, the second housing 120 may further include a second protrusion 120f. The second protrusion 120f may protrude from an end portion of the second housing 120 toward the second sliding part 320. The second protrusion 120f may prevent the second fiber structure 352 from being visible from the outside. The second protrusion 120f may be spaced part from the second sliding part 320 at a specified interval.

Figure 10:
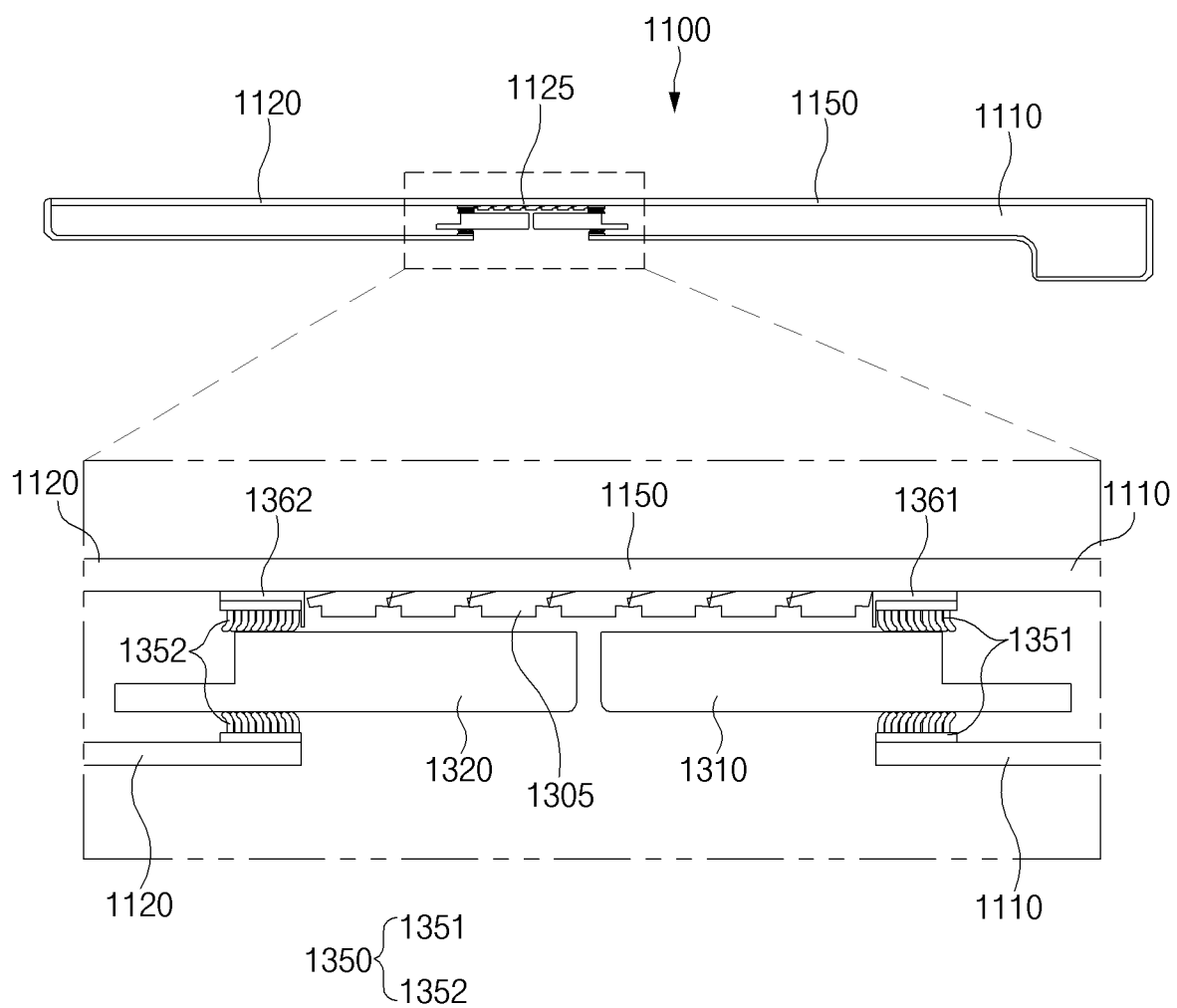
FIGS. 10, 11 and 12 are diagrams illustrating example annular fiber structures according to various embodiments.
Figure 11:
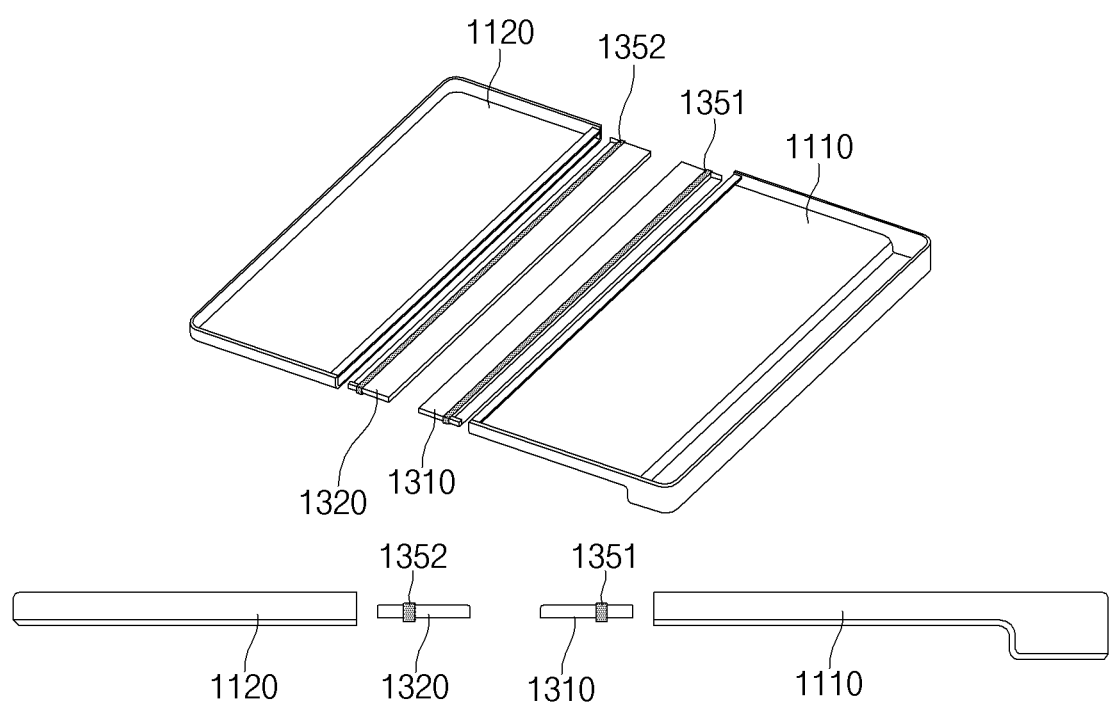
Figure 12:
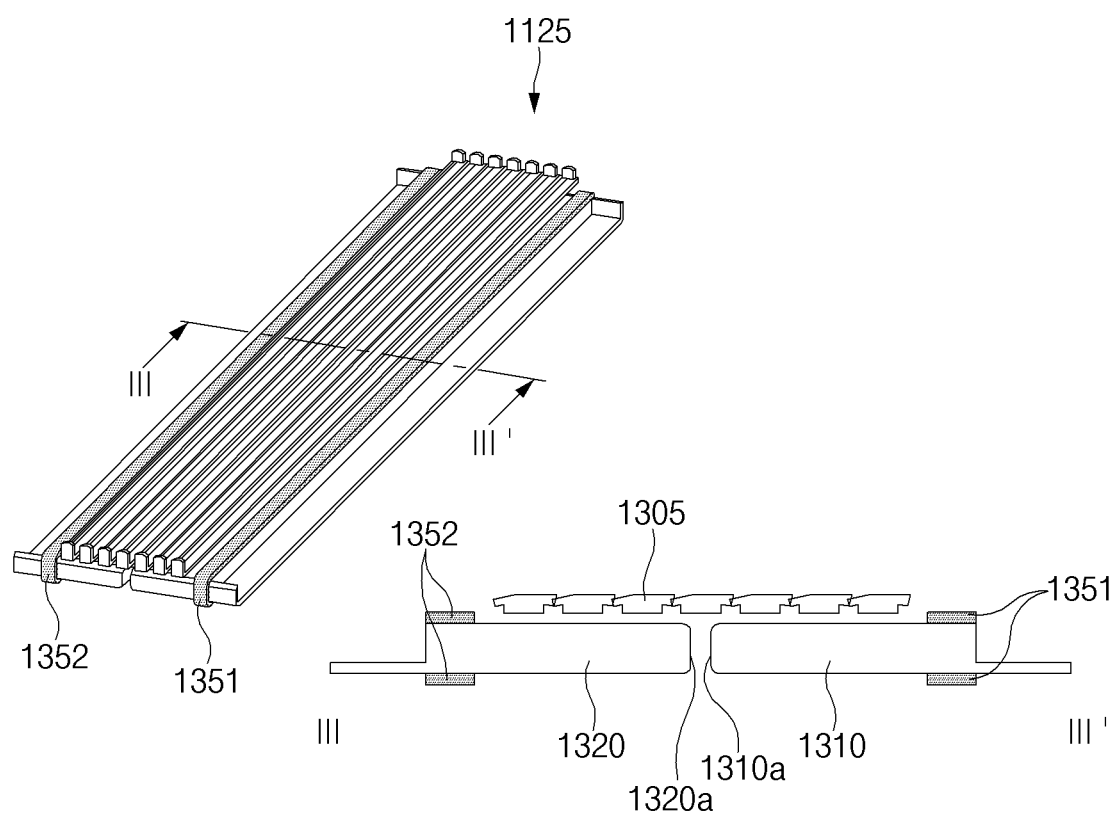

FIGS. 10, 11 and 12 are diagrams illustrating example annular fiber structures according to various embodiments.

Referring to FIGS. 10, 11 and 12, a foldable electronic device 1100 may include a first housing (or, a first main body) 1110, a second housing (or, a second main body) 1120, a hinge module (or, a hinge structure, a center-of-rotation part, or a connecting part) 1125, a display 1150, and a fiber structure 1350. The foldable electronic device 1100 may be folded or unfolded by rotation of the first housing 1110 or the second housing 1120 about the hinge module 1125.

The hinge housing 1125 may be disposed between the first housing 1110 and the second housing 1120. The first housing 110 and the second housing 1120 may be folded or unfolded depending on a change in the form of the hinge module 1125. The hinge module 1125 may include a multi-joint structure 1305, a first sliding part 1310, and a second sliding part 1320. According to various embodiments, in an unfolded state, an end portion 1310a of the first sliding part 1310 may make contact with, or may be close to, an end portion 1320a of the second sliding part 1320. Depending on a folding operation, the end portion 1310a of the first sliding part 1310 and the end portion 1320a of the second sliding part 1320 may move away from each other.

The fiber structure 1350 may include one or more fiber structures and may have a form that surrounds the first sliding part 1301 or the second sliding part 1320 in a lengthwise direction.

According to an embodiment, the fiber structure 1350 may be fixed to the first sliding part 1310 or the second sliding part 1320. For example, the fiber structure 1350 may be formed of an elastic material and may be fixed to the first sliding part 1310 or the second sliding part 1320 by an elastic force caused by elongation of the fiber structure 1350 that surrounds the first sliding part 1310 or the second sliding part 1320.

According to an embodiment, the fiber structure 1350 may be fixed, through an adhesive (e.g., a double-sided tape), to a surrounding structure (e.g., the first housing 1110, the second housing 1120, the hinge module 1125, or the display 1150) that faces the first sliding part 1310 or the second sliding part 1320.

According to an embodiment, a portion of the fiber structure 1350 may be fixed to the first sliding part 1310 or the second sliding part 1320, and another portion of the fiber structure 1350 may be fixed to the surrounding structure (e.g., the first housing 1110, the second housing 1120, the hinge module 1125, or the display 1150).

According to various embodiments, a separate friction reducing member may be provided between the fiber structure 1350 and the surrounding structure (e.g., the first housing 1110, the second housing 1120, the hinge module 1125, or the display 1150). For example, the friction reducing member may be formed of Teflon or a fluorine-coated material.

According to an embodiment, the fiber structure 1350 may include a first fiber structure 1351 and a second fiber structure 1352. The first fiber structure 1351 may have an annular shape that surrounds the first sliding part 1310. The second fiber structure 1352 may have an annular shape that surrounds the second sliding part 1320.

Inside the first housing 1110, the first fiber structure 1351 may surround the first sliding part 1310. A fiber part of the first fiber structure 1351 may surround the first sliding part 1310 so as to face toward the first sliding part 1310.

According to an embodiment, a portion of a base of the first fiber structure 1351 may be attached to an inner surface of the first housing 1110 through an adhesive (e.g., a double-sided tape). Another portion of the base of the first fiber structure 1351 may be attached to a bracket 1362 inside the first housing 1110 through an adhesive (e.g., a double-sided tape).

Inside the second housing 1120, the second fiber structure 1352 may surround the second sliding part 1320. A fiber part of the second fiber structure 1352 may surround the second sliding part 1320 so as to face toward the second sliding part 1320.

According to an embodiment, a portion of a base of the second fiber structure 1352 may be attached to an inner surface of the second housing 1120 through an adhesive (e.g., a double-sided tape). Another portion of the base of the second fiber structure 1352 may be attached to a bracket 1362 inside the second housing 1120 through an adhesive (e.g., a double-sided tape).

Figure 13:
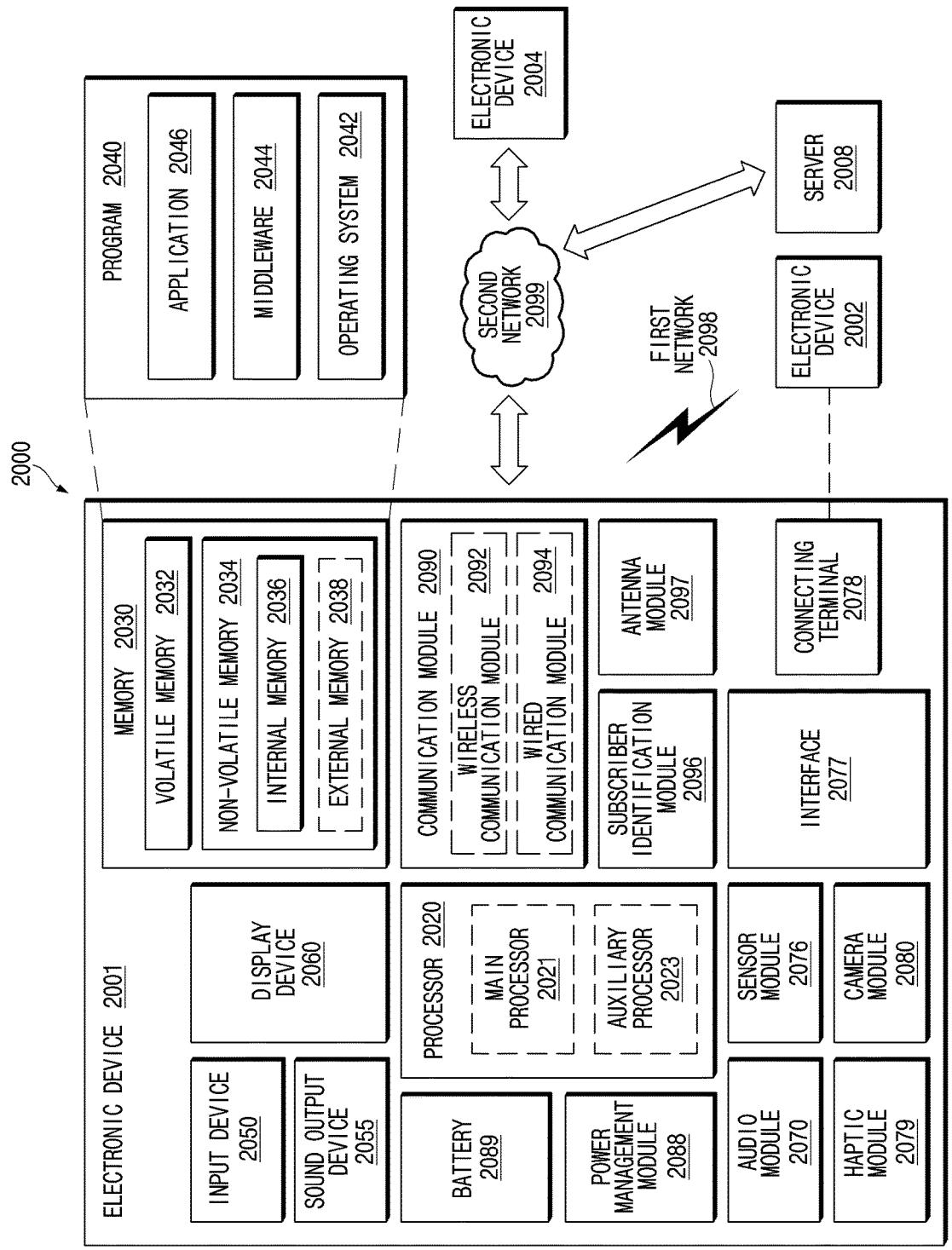
FIG. 13 is a block diagram illustrating an example electronic device in a network environment according to various embodiments.

FIG. 13 is a block diagram illustrating an example electronic device 2001 in a network environment 2000, according to various embodiments. An electronic device may include at least one of, for example, and without limitation, a portable communication device (e.g., a smartphone, a computer device (e.g., a PDA: personal digital assistant), a tablet PC, a laptop PC, a desktop PC, a workstation, or a server), a portable multimedia device (e.g., e-book reader or MP3 player), a portable medical device (e.g., heart rate, blood sugar, blood pressure, or body temperature measuring device), a camera, a wearable device, or the like. The wearable device may include, for example, and without limitation, at least one of an accessory type device (e.g., watches, rings, bracelets, anklets, necklaces, glasses, contact lenses, or head wearable device head-mounted-device (HMD)), a fabric or clothing integral device (e.g., an electronic clothing), a body-attached device (e.g., skin pads or tattoos), a bio implantable circuit, or the like. In some embodiments, the electronic device may include at least one of, for example, and without limitation, a television, a DVD (digital video disk) player, an audio device, an audio accessory device (e.g., a speaker, headphones, or a headset), a refrigerator, an air conditioner, a cleaner, an oven, a microwave oven, a washing machine, an air purifier, a set top box, a home automation control panel, a security control panel, a game console, an electronic dictionary, an electronic key, a camcorder, an electronic picture frame, or the like.

In another embodiment, the electronic device may include, for example, and without limitation, at least one of a navigation device, GNSS (global navigation satellite system), an EDR (event data recorder (e.g., black box for vehicle/ship/airplane), an automotive infotainment device (e.g., vehicle head-up display), an industrial or home robot, a drone, ATM (automated teller machine), a POS (point of sales) instrument, a measurement instrument (e.g., water, electricity, or gas measurement equipment), an Internet of Things device (e.g. bulb, sprinkler device, fire alarm, temperature regulator, or street light), or the like. The electronic device according to the embodiment of the disclosure is not limited to the above-described devices. Further, for example, as in a smart phone equipped with measurement of biometric information (e.g., a heart rate or blood glucose) of an individual, the electronic device may have a combination of functions of a plurality of devices. In the disclosure, the term "user" may refer to a person using the electronic device or a device (e.g., an artificial intelligence electronic device) using the electronic device.

FIG. 13 is a block diagram illustrating an example electronic device 2001 (e.g., the foldable electronic device 100 of FIG. 1, the foldable electronic device 1100 of FIG. 10) in a network environment 2000, according to various embodiments. Referring to FIG. 13, the electronic device 2001 in the network environment 2000 may communicate with an electronic device 2002 over a first network 2098 (e.g., a short range wireless communication network) or may communicate with an electronic device 2004 or a server 2008 over a second network 2099 (e.g., a long distance wireless communication network). According to an embodiment, the electronic device 2001 may communicate with the electronic device 2004 through the server 2008. According to an embodiment, the electronic device 2001 may include a processor 2020, a memory 2030, an input device 2050, a sound output device 2055, a display device 2060, an audio module 2070, a sensor module 2076, an interface 2077, a haptic module 2079, a camera module 2080, a power management module 2088, a battery 2089, a communication module 2090, a subscriber identification module 2096, or an antenna module 2097. In any embodiment, at least one (e.g., the display device 2060 or the camera module 2080) of the components may be omitted from the electronic device 2001, or one or more other components may be further included in the electronic device 2001. In any embodiment, some of the components may be implemented with a single integrated circuit. For example, the sensor module 2076 (e.g., a fingerprint sensor, an iris sensor, or an illumination sensor) may be embedded in the display device 2060 (e.g., a display).

The processor 2020 may execute, for example, software (e.g., a program 2040) to control at least one other component (e.g., a hardware or software component) of the electronic device 2001 connected to the processor 2020, and may perform various data processing or operations. According to an embodiment, as at least a part of the data processing or operations, the processor 2020 may load a command or data received from any other component (e.g., the sensor module 2076 or the communication module 2090) to a volatile memory 2032, may process the command or data stored in the volatile memory 2032, and may store processed data in a nonvolatile memory 2034. According to an embodiment, the processor 2020 may include a main processor 2021 (e.g., a central processing unit or an application processor) and an auxiliary processor 2023 (e.g., a graphic processing device, an image signal processor, a sensor hub processor, or a communication processor), which may be operated independently of or together with the main processor 2021. Additionally or alternatively, the auxiliary processor 2023 may be configured to use lower power than the main processor 2021 or to be specialized for a specified function. The auxiliary processor 2023 may be implemented separately from the main processor 2021 or may be implemented as a part of the main processor 2021.

The auxiliary processor 2023 may control at least a part of a function or states associated with at least one component (e.g., the display device 2060, the sensor module 2076, or the communication module 2090) of the electronic device 2001, for example, instead of the main processor 2021 while the main processor 2021 is in an inactive (e.g., sleep) state and together with the main processor 2021 while the main processor 2021 is in an active (e.g., an application execution) state. According to an embodiment, the auxiliary processor 2023 (e.g., an image signal processor or a communication processor) may be implemented as a part of any other component (e.g., the camera module 2080 or the communication module 2090) which is functionally (or operatively) associated with the auxiliary processor 2023.

The memory 2030 may store various data which are used by at least one component (e.g., the processor 2020 or the sensor module 2076) of the electronic device 2001. The data may include, for example, software (e.g., the program 2040), or input data or output data associated with a command of the software. The memory 2030 may include the volatile memory 2032 or the nonvolatile memory 2034.

The program 2040 may be stored in the memory 2030 as software, and may include, for example, an operating system 2042, a middleware 2044, or an application 2046.

The input device 2050 may receive a commands or data which will be used by a component (e.g., the processor 2020) of the electronic device 2001, from the outside (e.g., a user) of the electronic device 2001. The input device 2050 may include, for example, a microphone, a mouse, or a keyboard.

The sound output device 2055 may output a sound signal to the outside of the electronic device 2001. The sound output device 2055 may include, for example, a speaker or a receiver. The speaker may be used for a general purpose such as multimedia play or recording play, and the receiver may be used to receive an incoming call. According to an embodiment, the receiver may be implemented separately from the speaker or may be implemented as a part of the speaker.

The display device 2060 may visually provide information to the outside (e.g., the user) of the electronic device 2001. The display device 2060 may include, for example, a display, a hologram device, or a control circuit for controlling a projector and a corresponding device. According to an embodiment, the display device 2060 may include a touch circuitry configured to sense a touch, or a sensor circuitry (e.g., a pressure sensor) configured to measure the strength of force generated by the touch.

The audio module 2070 may convert sound to an electrical signal, or reversely, may convert an electrical signal to sound. According to an embodiment, the audio module 2070 may obtain sound through the input device 2050, or may output sound through the sound output device 2055, or through an external electronic device (e.g., the electronic device 2002) (e.g., a speaker or a headphone) directly or wirelessly connected with the electronic device 2001.

The sensor module 2076 may sense an operation state (e.g., power or a temperature) of the electronic device 2001 or an external environment state (e.g., a user state), and may generate an electrical signal or a data value corresponding the sensed state. According to an embodiment, the sensor module 2076 may include, for example, a gesture sensor, a grip sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 2077 may support one or more specified protocols that may be used to directly and wirelessly connect the electronic device 2001 with an external electronic device (e.g., the electronic device 2002). According to an embodiment, the interface 2077 may include, for example, a high definition multimedia interface (HDMI), a universal serial bus (USB) interface, a secure digital (SD) card interface, or an audio interface.

A connection terminal 2078 may include a connector that may allow the electronic device 2001 to be physically connected with an external electronic device (e.g., the electronic device 2002). According to an embodiment, the connection terminal 2078 may include, for example, a HDMI connector, a USB connector, a SD card connector, or an audio connector (e.g., a headphone connector).

The haptic module 2079 may convert an electrical signal to a mechanical stimulation (e.g., vibration or movement) or an electrical stimulation which the user may perceive through the sense of touch or the sense of movement. According to an embodiment, the haptic module 2079 may include, for example, a motor, a piezoelectric sensor, or an electrical stimulation device.

The camera module 2080 may photograph a still image and a video. According to an embodiment, the camera module 2080 may include one or more lenses, image sensors, image signal processors, or flashes (or electrical flashes).

The power management module 2088 may manage the power which is supplied to the electronic device 2001. According to an embodiment, the power management module 2088 may be implemented, for example, as at least a part of a power management integrated circuit (PMIC).

The battery 2089 may power at least one component of the electronic device 2001. According to an embodiment, the battery 2089 may include, for example, a primary cell not recharged, a secondary cell rechargeable, or a fuel cell.

The communication module 2090 may establish a direct (or wired) communication channel or a wireless communication channel between the electronic device 2001 and an external electronic device (e.g., the electronic device 2002, the electronic device 2004, or the server 2008) or may perform communication through the established communication channel. The communication module 2090 may include one or more communication processors which is operated independently of the processor 2020 (e.g., an application processor) and supports direct (or wired) communication or wireless communication. According to an embodiment, the communication module 2090 may include a wireless communication module 2092 (e.g., a cellular communication module, a short range wireless communication module, or a global navigation satellite system (GNSS) communication module) or a wired communication module 2094 (e.g., a local area network (LAN) communication module or a power line communication module). A corresponding communication module of such communication modules may communicate with an external electronic device over the first network 2098 (e.g., a short range communication network such as Bluetooth, Wi-Fi direct, or infrared data association (IrDA)) or the second network 2099 (e.g., a long distance communication network such as a cellular network, an Internet, or a computer network (e.g., LAN or WAN)). The above-described kinds of communication modules may be integrated in one component (e.g., a single chip) or may be implemented with a plurality of components (e.g., a plurality of chips) which are independent of each other. The wireless communication module 2092 may verify and authenticate the electronic device 2001 within a communication network, such as the first network 2098 or the second network 2099, using subscriber information (e.g., international mobile subscriber identity (IMSI)) stored in the subscriber identification module 2096.

The antenna module 2097 may transmit a signal or a power to the outside (e.g., an external electronic device) or may receive a signal or a power from the outside. According to an embodiment, the antenna module 2097 may include one or more antennas, and at least one antenna which is suitable for a communication scheme used in a computer network such as the first network 2098 or the second network 2099 may be selected, for example, by the communication module 2090 from the one or more antennas. The signal or power may be exchanged between the communication module 2090 and an external electronic device through the selected at least one antenna or may be received from the external electronic device through the selected at least one antenna and the communication module 2090.

At least some of the components may be connected to each other through a communication scheme (e.g., a bus, a general purpose input and output (GPIO), a serial peripheral interface (SPI), or a mobile industry processor interface (MIPI)) between peripheral devices and may exchange signals (e.g., commands or data) with each other.

According to an embodiment, a command or data may be transmitted or received (or exchanged) between the electronic device 2001 and the external electronic device 2004 through the server 2008 connecting to the second network 2099. Each of the electronic devices 2002 and 2004 may be a device, the kind of which is the same as or different from a kind of the electronic device 2001. According to an embodiment, all or a part of operations to be executed in the electronic device 2001 may be executed in one or more external devices of the external electronic devices 2002, 2004, or 2008. For example, in the case where the electronic device 2001 should perform any function or service automatically or in response to a request from the user or any other device, the electronic device 2001 may request one or more external electronic devices to perform at least a part of the function or service, instead of internally executing the function or service or additionally. The one or more external electronic devices which receive the request may execute at least a part of the function or service thus requested or an additional function or service associated with the request, and may provide a result of the execution to the electronic device 2001. The electronic device 2001 may process received result as it is or additionally, and may provide a result of the processing as at least a part of the response to the request. To this end, for example, a cloud computing, distributed computing, or client-server computing technology may be used.

An electronic device (e.g., the foldable electronic device 100 of FIG. 1, the foldable electronic device 1100 of FIG. 10, or the electronic device 2001 of FIG. 13) according to various example embodiments may include a first housing (e.g., the first housing 110 of FIG. 1 or the first housing 1110 of FIG. 10), a second housing (e.g., the second housing 120 of FIG. 1 or the second housing 1120 of FIG. 10), a display (e.g., the display 150 of FIG. 1, the display 1150 of FIG. 10, or the display device 2060 of FIG. 13), at least a portion of which is disposed on the first housing (e.g., the first housing 110 of FIG. 1 or the first housing 1110 of FIG. 10) and the second housing (e.g., the second housing 120 of FIG. 1 or the second housing 1120 of FIG. 10), a hinge (e.g., the hinge module 125 of FIG. 1 or the hinge module 1125 of FIG. 10) disposed between the first housing (e.g., the first housing 110 of FIG. 1 or the first housing 1110 of FIG. 10) and the second housing (e.g., the second housing 120 of FIG. 1 or the second housing 1120 of FIG. 10) and overlapping the first housing (e.g., the first housing 110 of FIG. 1 or the first housing 1110 of FIG. 10) and the second housing (e.g., the second housing 120 of FIG. 1 or the second housing 1120 of FIG. 10), the first housing (e.g., the first housing 110 of FIG. 1 or the first housing 1110 of FIG. 10) and the second housing (e.g., the second housing 120 of FIG. 1 or the second housing 1120 of FIG. 10) configured to be folded or unfolded based on a folding operation or an unfolding operation of the hinge (e.g., the hinge module 125 of FIG. 1 or the hinge module 1125 of FIG. 10), and a fiber structure comprising at least one fiber (e.g., the fiber structure 350 of FIG. 5 or the fiber structure 1350 of FIG. 10) disposed in a portion where the first housing (e.g., the first housing 110 of FIG. 1 or the first housing 1110 of FIG. 10) or the second housing (e.g., the second housing 120 of FIG. 1 or the second housing 1120 of FIG. 10) and the hinge (e.g., the hinge module 125 of FIG. 1 or the hinge module 1125 of FIG. 10) overlap each other. The hinge (e.g., the hinge module 125 of FIG. 1 or the hinge module 1125 of FIG. 10) may include a multi-joint arrangement (e.g., the multi-joint structure 305 of FIG. 2 or the multi-joint structure 1305 of FIG. 10) bendable in a specified curve form, a first sliding part (e.g., the first sliding part 310 of FIG. 2 or the first sliding part 1310 of FIG. 10) coupled to one side of the multi-joint arrangement (e.g., the multi-joint structure 305 of FIG. 2 or the multi-joint structure 1305 of FIG. 10) and configured to move inside or outside the first housing (e.g., the first housing 110 of FIG. 1 or the first housing 1110 of FIG. 10) based on a folding or unfolding operation of the multi-joint arrangement (e.g., the multi-joint structure 305 of FIG. 2 or the multi-joint structure 1305 of FIG. 10), and a second sliding part (e.g., the second sliding part 320 of FIG. 2 or the second sliding part 1320 of FIG. 10) coupled to another side of the multi-joint arrangement (e.g., the multi-joint structure 305 of FIG. 2 or the multi-joint structure 1305 of FIG. 10) and configured to move inside or outside the second housing (e.g., the second housing 120 of FIG. 1 or the second housing 1120 of FIG. 10) based on the folding or unfolding operation of the multi-joint arrangement (e.g., the multi-joint structure 305 of FIG. 2 or the multi-joint structure 1305 of FIG. 10). The fiber structure (e.g., the fiber structure 350 of FIG. 5 or the fiber structure 1350 of FIG. 10) may include a fiber part including at least one fiber, at least a portion of which makes contact with the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10), the fiber part configured to be deformed based on a movement of the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10) and a base fixing the fiber part.

According to various example embodiments, the base of the fiber structure (e.g., the fiber structure 350 of FIG. 5 or the fiber structure 1350 of FIG. 10) may be attached to the first housing (e.g., the first housing 110 of FIG. 1 or the first housing 1110 of FIG. 10) or the second housing (e.g., the second housing 120 of FIG. 1 or the second housing 1120 of FIG. 10).

According to various example embodiments, the base of the fiber structure (e.g., the fiber structure 350 of FIG. 5 or the fiber structure 1350 of FIG. 10) may be attached to a first surface (e.g., the first inner surface 120*d* of FIG. 7) of the first housing (e.g., the first housing 110 of FIG. 1 or the first housing 1110 of FIG. 10) or the second housing (e.g., the second housing 120 of FIG. 1 or the second housing 1120 of FIG. 10) and a second surface (e.g., the second inner surface 120*e* of FIG. 7) perpendicular to the first surface.

According to various example embodiments, the fiber structure (e.g., the fiber structure 350 of FIG. 5 or the fiber structure 1350 of FIG. 10) may be configured to be pressed by the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10).

According to various example embodiments, a direction in which the fiber part leans may be changed based on a direction in which the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10) moves.

According to various example embodiments, the electronic device (e.g., the foldable electronic device 100 of FIG. 1, the foldable electronic device 1100 of FIG. 10, or the electronic device 2001 of FIG. 13) may further include a first PCB contained in the first housing (e.g., the first housing 110 of FIG. 1 or the first housing 1110 of FIG. 10) and a second PCB contained in the second housing (e.g., the second housing 120 of FIG. 1 or the second housing 1120 of FIG. 10). The fiber structure (e.g., the fiber structure 350 of FIG. 5 or the fiber structure 1350 of FIG. 10) may be disposed between the first PCB (e.g., the first PCB 161 of FIG. 6A) and the second PCB (e.g., the second PCB 162 of FIG. 6A).

According to various example embodiments, the electronic device (e.g., the foldable electronic device 100 of FIG. 1, the foldable electronic device 1100 of FIG. 10, or the electronic device 2001 of FIG. 13) may further include a first battery contained in the first housing (e.g., the first housing 110 of FIG. 1 or the first housing 1110 of FIG. 10) and a second battery contained in the second housing (e.g., the second housing 120 of FIG. 1 or the second housing 1120 of FIG. 10). The fiber structure (e.g., the fiber structure 350 of FIG. 5 or the fiber structure 1350 of FIG. 10) may be disposed between the first battery and the second battery.

According to various example embodiments, the fiber structure (e.g., the fiber structure 350 of FIG. 5 or the fiber structure 1350 of FIG. 10) may include a first fiber structure (e.g., the fiber structure 350 of FIG. 5 or the fiber structure 1350 of FIG. 10) configured to fill a first gap between the first sliding part (e.g., the first sliding part 310 of FIG. 2 or the first sliding part 1310 of FIG. 10) and the first housing (e.g., the first housing 110 of FIG. 1 or the first housing 1110 of FIG. 10) and a second fiber structure (e.g., the fiber structure 350 of FIG. 5 or the fiber structure 1350 of FIG. 10) configured to fill a second gap between the second sliding part (e.g., the second sliding part 320 of FIG. 2 or the second sliding part 1320 of FIG. 10) and the second housing (e.g., the second housing 120 of FIG. 1 or the second housing 1120 of FIG. 10).

According to various example embodiments, the fiber structure (e.g., the fiber structure 350 of FIG. 5 or the fiber structure 1350 of FIG. 10) may be exposed to the outside through the first gap or the second gap, and the first housing (e.g., the first housing 110 of FIG. 1 or the first housing 1110 of FIG. 10) or the second housing (e.g., the second housing 120 of FIG. 1 or the second housing 1120 of FIG. 10) may include a protrusion configured to hide the fiber structure (e.g., the fiber structure 350 of FIG. 5 or the fiber structure 1350 of FIG. 10) in the first gap or the second gap.

According to various example embodiments, the fiber structure (e.g., the fiber structure 350 of FIG. 5 or the fiber structure 1350 of FIG. 10) may be configured to block foreign matter introduced from the outside through the first gap or the second gap.

According to various example embodiments, at least a portion of the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10) may be exposed to the outside in a state in which the first housing (e.g., the first housing 110 of FIG. 1 or the first housing 1110 of FIG. 10) and the second housing (e.g., the second housing 120 of FIG. 1 or the second housing 1120 of FIG. 10) are unfolded.

According to various example embodiments, an end portion of the first sliding part (e.g., the first sliding part 310 of FIG. 2 or the first sliding part 1310 of FIG. 10) and an end portion of the second sliding part (e.g., the second sliding part 320 of FIG. 2 or the second sliding part 1320 of FIG. 10) may be configured to make contact with, or to be adjacent to, each other in a state in which the first housing (e.g., the first housing 110 of FIG. 1 or the first housing 1110 of FIG. 10) and the second housing (e.g., the second housing 120 of FIG. 1 or the second housing 1120 of FIG. 10) are unfolded.

According to various example embodiments, the first housing (e.g., the first housing 110 of FIG. 1 or the first housing 1110 of FIG. 10) and the second housing (e.g., the second housing 120 of FIG. 1 or the second housing 1120 of FIG. 10) may have shapes asymmetric to each other.

According to various example embodiments, at least a portion of the display (e.g., the display 150 of FIG. 1, the display 1150 of FIG. 10, or the display device 2060 of FIG. 13) may be flexible in an area adjacent to the hinge (e.g., the hinge module 125 of FIG. 1 or the hinge module 1125 of FIG. 10).

According to various example embodiments, the display (e.g., the display 150 of FIG. 1, the display 1150 of FIG. 10, or the display device 2060 of FIG. 13) may be visible to the outside when the first housing (e.g., the first housing 110 of FIG. 1 or the first housing 1110 of FIG. 10) and the second housing (e.g., the second housing 120 of FIG. 1 or the second housing 1120 of FIG. 10) are folded.

According to various example embodiments, the fiber structure (e.g., the fiber structure 350 of FIG. 5 or the fiber structure 1350 of FIG. 10) may be fixed to the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10).

According to various example embodiments, the fiber structure (e.g., the fiber structure 350 of FIG. 5 or the fiber structure 1350 of FIG. 10) may surround the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10).

According to various example embodiments, the fiber structure (e.g., the fiber structure 350 of FIG. 5 or the fiber structure 1350 of FIG. 10) may surround the first sliding part (e.g., the first sliding part 310 of FIG. 2 or the first sliding part 1310 of FIG. 10) or the second sliding part (e.g., the second sliding part 320 of FIG. 2 or the second sliding part 1320 of FIG. 10) such that the fiber part faces the first sliding part (e.g., the fiber structure 350 of FIG. 5 or the fiber structure 1350 of FIG. 10) or the second sliding part (e.g., the second sliding part 320 of FIG. 2 or the second sliding part 1320 of FIG. 10), and at least a portion of the base may be attached to the first housing (e.g., the first housing 110 of FIG. 1 or the first housing 1110 of FIG. 10) or the second housing (e.g., the second housing 120 of FIG. 1 or the second housing 1120 of FIG. 10).

Another portion of the base of the fiber structure may be attached to a bracket on a rear surface of the display.

The electronic device according to various example embodiments disclosed in the disclosure may be various types of devices. The electronic device may include, for example, a portable communication device (e.g., a smartphone), a computer device, a portable multimedia device, a mobile medical appliance, a camera, a wearable device, a home appliance, or the like. The electronic device according to an embodiment of the disclosure should not be limited to the above-mentioned devices.

It should be understood that various example embodiments of the disclosure and terms used in the embodiments do not intend to limit technical features disclosed in the disclosure to a particular embodiment disclosed herein; rather, the disclosure should be understood to cover various modifications, equivalents, or alternatives of embodiments of the disclosure. With regard to description of drawings, similar or related components may be assigned with similar reference numerals. As used herein, singular forms of noun corresponding to an item may include one or more items unless the context clearly indicates otherwise. In the disclosure disclosed herein, each of the expressions "A or B", "at least one of A and B", "at least one of A or B", "A, B, or C", "one or more of A, B, and C", or "one or more of A, B, or C", and the like used herein may include any and all combinations of one or more of the associated listed items. The expressions, such as "a first", "a second", "the first", or "the second", may be used merely for the purpose of distinguishing a component from the other components, but do not limit the corresponding components in other aspect (e.g., the importance or the order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

The term "module" used in the disclosure may include a unit implemented in hardware, software, or firmware, or any combination thereof, and may be interchangeably used with the terms "logic", "logical block", "part" and "circuit". The "module" may be a minimum unit of an integrated part or may be a part thereof. The "module" may be a minimum unit for performing one or more functions or a part thereof. For example, according to an embodiment, the "module" may include an application-specific integrated circuit (ASIC).

Various embodiments of the disclosure may be implemented by software (e.g., the program 2040) including an instruction stored in a machine-readable storage medium (e.g., an internal memory 2036 or an external memory 2038) readable by a machine (e.g., the electronic device 2001). For example, the processor (e.g., the processor 2020) of a machine (e.g., the electronic device 2001) may call the instruction from the machine-readable storage medium and execute the instructions thus called. Accordingly the machine may perform at least one function based on the called at least one instruction. The one or more instructions may include a code made by a compiler or a code executable by an interpreter. The machine-readable storage medium may be provided in the form of non-transitory storage medium. Here, the "non-transitory" storage medium is tangible, but may not include a signal (e.g., an electromagnetic wave). The term "non-transitory" does not differentiate a case where the data is permanently stored in the storage medium from a case where the data is temporally stored in the storage medium.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be directly distributed (e.g., download or upload) online through an application store (e.g., a Play Store™) or between two user devices (e.g., the smartphones). In the case of online distribution, at least a portion of the computer program product may be temporarily stored or generated in a machine-readable storage medium such as a memory of a manufacturer's server, an application store's server, or a relay server.

According to various embodiments, each component (e.g., the module or the program) of the above-described components may include one or plural entities. According to various embodiments, at least one or more components of the above components or operations may be omitted, or one or more components or operations may be added. Alternatively or additionally, some components (e.g., the module or the program) may be integrated in one component. In this case, the integrated component may perform the same or similar functions performed by each corresponding components prior to the integration. According to various embodiments, operations performed by a module, a programming, or other components may be executed sequentially, in parallel, repeatedly, or in a heuristic method, or at least some operations may be executed in different sequences, omitted, or other operations may be added.

As described above, the foldable electronic devices according to the various embodiments of the disclosure may prevent and/or reduce infiltration of foreign matter using the fiber structure disposed around the hinge module.

Furthermore, the foldable electronic devices according to the various embodiments of the disclosure may include the blocking structure for preventing and/or reducing the fiber structure from being visible from the outside.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a first housing;
a second housing;
a display, at least a portion of which is disposed on the first housing and the second housing;
a hinge disposed between the first housing and the second housing and overlapping the first housing and the second housing, the first housing and the second housing configured to be folded or unfolded based on a folding operation or an unfolding operation of the hinge; and
a fiber structure including at least one fiber disposed in a portion where the first housing or the second housing and the hinge overlap each other,
wherein the hinge includes:
a multi-joint arrangement bendable in a specified curve form;
a first sliding part coupled to one side of the multi-joint arrangement and configured to move inside or outside the first housing based on a folding or unfolding operation of the multi-joint arrangement; and
a second sliding part coupled to another side of the multi-joint arrangement and configured to move inside or outside the second housing based on the folding or unfolding operation of the multi-joint arrangement, and
wherein the fiber structure includes:
a fiber part including at least one fiber, at least a portion of which contacts the first sliding part or the second sliding part, the fiber part configured to be deformed based on a movement of the first sliding part or the second sliding part; and
a base to which the fiber part is fixed.

2. The electronic device of claim 1, wherein the base of the fiber structure is attached to the first housing or the second housing.

3. The electronic device of claim 2, wherein the base of the fiber structure is attached to a first surface of the first housing or the second housing and a second surface perpendicular to the first surface.

4. The electronic device of claim 1, wherein the fiber structure is disposed such that at least a portion of the fiber part is configured to be pressed by the first sliding part or the second sliding part.

5. The electronic device of claim 1, wherein a direction in which the fiber part leans is configured to change based on a direction in which the first sliding part or the second sliding part moves.

6. The electronic device of claim 1, further comprising:
a first printed circuit board (PCB) contained in the first housing; and
a second PCB contained in the second housing,
wherein the fiber structure is disposed between the first PCB and the second PCB.

7. The electronic device of claim 1, further comprising:
a first battery contained in the first housing; and
a second battery contained in the second housing,
wherein the fiber structure is disposed between the first battery and the second battery.

8. The electronic device of claim 1, wherein the fiber structure includes:
a first fiber structure including at least one fiber configured to fill a first gap between the first sliding part and the first housing; and
a second fiber structure including at least one fiber configured to fill a second gap between the second sliding part and the second housing.

9. The electronic device of claim 8, wherein the fiber structure is exposed to the outside through the first gap or the second gap.

10. The electronic device of claim 8, wherein the first housing or the second housing includes a protrusion configured to hide the fiber structure in the first gap or the second gap.

11. The electronic device of claim 8, wherein the fiber structure is configured to block foreign matter introduced from the outside through the first gap or the second gap.

12. The electronic device of claim 1, wherein at least a portion of the first sliding part or the second sliding part is exposed to an outside of the electronic device in a state in which the first housing and the second housing are unfolded.

13. The electronic device of claim 1, wherein an end portion of the first sliding part and an end portion of the second sliding part contact, or are adjacent to, each other in a state in which the first housing and the second housing are unfolded.

14. The electronic device of claim 1, wherein the first housing and the second housing have shapes asymmetric to each other.

15. The electronic device of claim 1, wherein at least a portion of the display is flexible in an area adjacent to the hinge module.

16. The electronic device of claim 1, wherein the display is visible to the outside based on the first housing and the second housing being folded.

17. The electronic device of claim 1, wherein the fiber structure is fixed to the first sliding part or the second sliding part.

18. The electronic device of claim 1, wherein the fiber structure surrounds the first sliding part or the second sliding part.

19. The electronic device of claim 18, wherein the fiber structure surrounds the first sliding part or the second sliding part such that the fiber part faces the first sliding part or the second sliding part, and
   wherein at least a portion of the base is attached to the first housing or the second housing.

20. The electronic device of claim 19, wherein another portion of the base of the fiber structure is attached to a bracket on a rear surface of the display.

* * * * *